US012636777B1

(12) United States Patent

Kirk et al.

(10) Patent No.: US 12,636,777 B1

(45) Date of Patent: May 26, 2026

(54) OBJECT PLACING VIA A MOBILE ROBOT INCLUDING NUDGING AND RELATED TECHNOLOGY

(71) Applicant: Agility Robotics, Inc., Pittsburgh, PA (US)

(72) Inventors: Connor Kirk, Pittsburgh, PA (US); Taylor Apgar, Portland, OR (US); Ashwin Rao, Corvallis, OR (US)

(73) Assignee: Agility Robotics, Inc., Salem, OR (US)

( * ) Notice: Subject to any disclaimer, the term of this patent is extended or adjusted under 35 U.S.C. 154(b) by 132 days.

(21) Appl. No.: 18/671,844

(22) Filed: May 22, 2024

Related U.S. Application Data

(60) Provisional application No. 63/648,100, filed on May 15, 2024.

(51) Int. Cl.
| | |
|---|---|
| *B25J 9/16* | (2006.01) |
| *B25J 13/08* | (2006.01) |
| *B25J 15/00* | (2006.01) |
| *B25J 15/10* | (2006.01) |

(52) U.S. Cl.
CPC .......... B25J 9/1612 (2013.01); B25J 13/082 (2013.01); B25J 13/085 (2013.01); B25J 15/0019 (2013.01); B25J 15/103 (2013.01)

(58) Field of Classification Search
CPC ...... B25J 9/1612; B25J 13/082; B25J 13/085; B25J 15/0019; B25J 15/103; B25J 9/00; B25J 9/16; B25J 9/0006; B25J 9/1661; B25J 9/1669; B25J 11/0095; B25J 15/08; B25J 15/083
See application file for complete search history.

(56) References Cited

U.S. PATENT DOCUMENTS

| | | | |
|---|---|---|---|
| 9,149,928 B2 | 10/2015 | Yamaguchi | |
| 11,117,266 B2 * | 9/2021 | Okuyama | ................ B25J 13/06 |
| 11,661,274 B1 * | 5/2023 | Patel | ...................... B25J 9/0096 |
| | | | 414/278 |
| 2005/0066799 A1 | 3/2005 | Fish | |

(Continued)

OTHER PUBLICATIONS

Khadivar et al., "Adaptive Fingers Coordination for Robust Grasp and In-Hand Manipulation Under Disturbances and Unknown Dynamics," Oct. 2023 (Year: 2023).*

(Continued)

*Primary Examiner* — Adam R Mott
*Assistant Examiner* — Byron X Kasper

(57) ABSTRACT

A method in accordance with a particular embodiment of the present technology relates to placing objects via end effectors of mobile robots using both coarse and fine manipulation processes. The method includes carrying an object while a portion of the object is disposed between opposable first and second fingers of the mobile robot. The method further includes moving the object to an intermediate placing state after carrying the object. The method also includes increasing a distance between the first and second fingers after moving the object to the intermediate placing state. The method still further includes nudging the object via contact between the object and the first finger after increasing the distance between the first and second fingers and while the second finger is out of contact with the object. This nudging urges the object from the intermediate placing state toward a subsequent placing state.

20 Claims, 22 Drawing Sheets

(56)                    References Cited

U.S. PATENT DOCUMENTS

| | | | |
|---|---|---|---|
| 2006/0184272 A1* | 8/2006 | Okazaki | B25J 9/1697 |
| | | | 700/245 |
| 2014/0103676 A1* | 4/2014 | Nammoto | B25J 18/02 |
| | | | 294/213 |
| 2017/0190510 A1* | 7/2017 | Porat | G08G 5/55 |
| 2018/0257244 A1* | 9/2018 | Takemura | B25J 15/08 |
| 2020/0055680 A1 | 2/2020 | Chavan Dafle | |
| 2020/0156260 A1* | 5/2020 | Takasaki | B25J 9/142 |
| 2020/0171677 A1 | 6/2020 | Endo | |
| 2021/0032031 A1* | 2/2021 | Kalouche | B25J 9/042 |
| 2021/0122043 A1 | 4/2021 | Menon | |
| 2021/0133668 A1 | 5/2021 | Mikayelyan | |
| 2021/0146532 A1 | 5/2021 | Rodriguez Garcia | |
| 2021/0178593 A1 | 6/2021 | Ye | |
| 2022/0346598 A1* | 11/2022 | Sinnet | A47J 37/1228 |
| 2022/0395988 A1 | 12/2022 | Milojevic et al. | |
| 2023/0211512 A1 | 7/2023 | Koyama | |
| 2023/0321694 A1 | 10/2023 | Darshan | |
| 2023/0321847 A1 | 10/2023 | Sheikholeslami et al. | |
| 2023/0347509 A1 | 11/2023 | Terasawa | |
| 2023/0398700 A1 | 12/2023 | Murase et al. | |
| 2024/0042626 A1* | 2/2024 | Kawaguchi | B25J 15/10 |
| 2024/0280965 A1 | 8/2024 | Drigalski | |
| 2024/0293936 A1* | 9/2024 | Hsieh | B25J 9/1687 |
| 2024/0316780 A1* | 9/2024 | Chaki | B25J 9/1643 |
| 2025/0135450 A1 | 5/2025 | Krasheninin | |
| 2025/0196361 A1* | 6/2025 | Cruciani | B25J 9/1694 |

OTHER PUBLICATIONS

A three fingered hand with a suction gripping system for picking various objects in cluttered narrow space (Year: 2017).

* cited by examiner

SYSTEM 300

COMPUTING COMPONENTS 302

PROCESSOR 304

MEMORY 306

PERSISTENT STORAGE 308

COMMUNICATION COMPONENTS 310

COMPUTER-READABLE MEDIA DRIVE 312

NETWORK CONNECTION 314

DISPLAY 315

ELECTROMECHANICAL COMPONENTS 316

ARM ACTUATORS 318

LEG ACTUATORS 320

POWER COMPONENTS 322

BATTERY 324

CHARGER 326

SENSOR COMPONENTS 328

*550*

*556*

*554*

*552*

*600*

START

CARRY OBJECT — *602a*

STAGE OBJECT — *602b*

RELEASE OBJECT — *602c*

NUDGE OBJECT — *602d*

CLEAR OBJECT — *602e*

END

OBJECT PLACING VIA A MOBILE ROBOT INCLUDING NUDGING AND RELATED TECHNOLOGY

CROSS-REFERENCE TO RELATED APPLICATION

This claims the benefit of U.S. Provisional Application No. 63/648,100, filed May 15, 2024. The foregoing application is incorporated herein by reference in its entirety. To the extent the foregoing application or any other material incorporated by reference conflicts with the present disclosure, the present disclosure controls.

TECHNICAL FIELD

The present technology relates to mobile robots that interact with objects.

BACKGROUND

Much of the work that humans currently perform is amenable to automation using robotics. For example, a large number of human workers currently focus on executing predefined movements of items and containers at order-fulfillment centers. Such predefined movements may occur many millions of times a day at a single order-fulfillment center and many billions of times a day across a network of order-fulfillment centers. Human effort would be better applied to more complex tasks, particularly those involving creativity, advanced problem solving, and social interaction. Presently, however, the need for order-fulfillment centers is large and rapidly increasing. Some analysts forecast a shortage of a million or more workers to staff order-fulfillment centers within the next ten to fifteen years. Due to the importance of this field, even small improvements in efficiency can have major impacts on macroeconomic productivity. For at least these reasons, there is a significant and growing need for innovation that supports automating tasks that humans currently perform at order-fulfillment centers and elsewhere.

BRIEF DESCRIPTION OF THE DRAWINGS

Certain aspects of the present technology can be better understood with reference to the following drawings. The relative dimensions in the drawings may be to scale with respect to some embodiments of the present technology. With respect to other embodiments, the drawings may not be to scale. The drawings may also be enlarged arbitrarily. For clarity, reference-number labels for analogous features may be omitted when the appropriate reference-number labels for such analogous features are clear in the context of the specification and all of the drawings considered together. Furthermore, the same reference numbers may be used to identify analogous features in multiple described embodiments.

DETAILED DESCRIPTION

Figure 1:
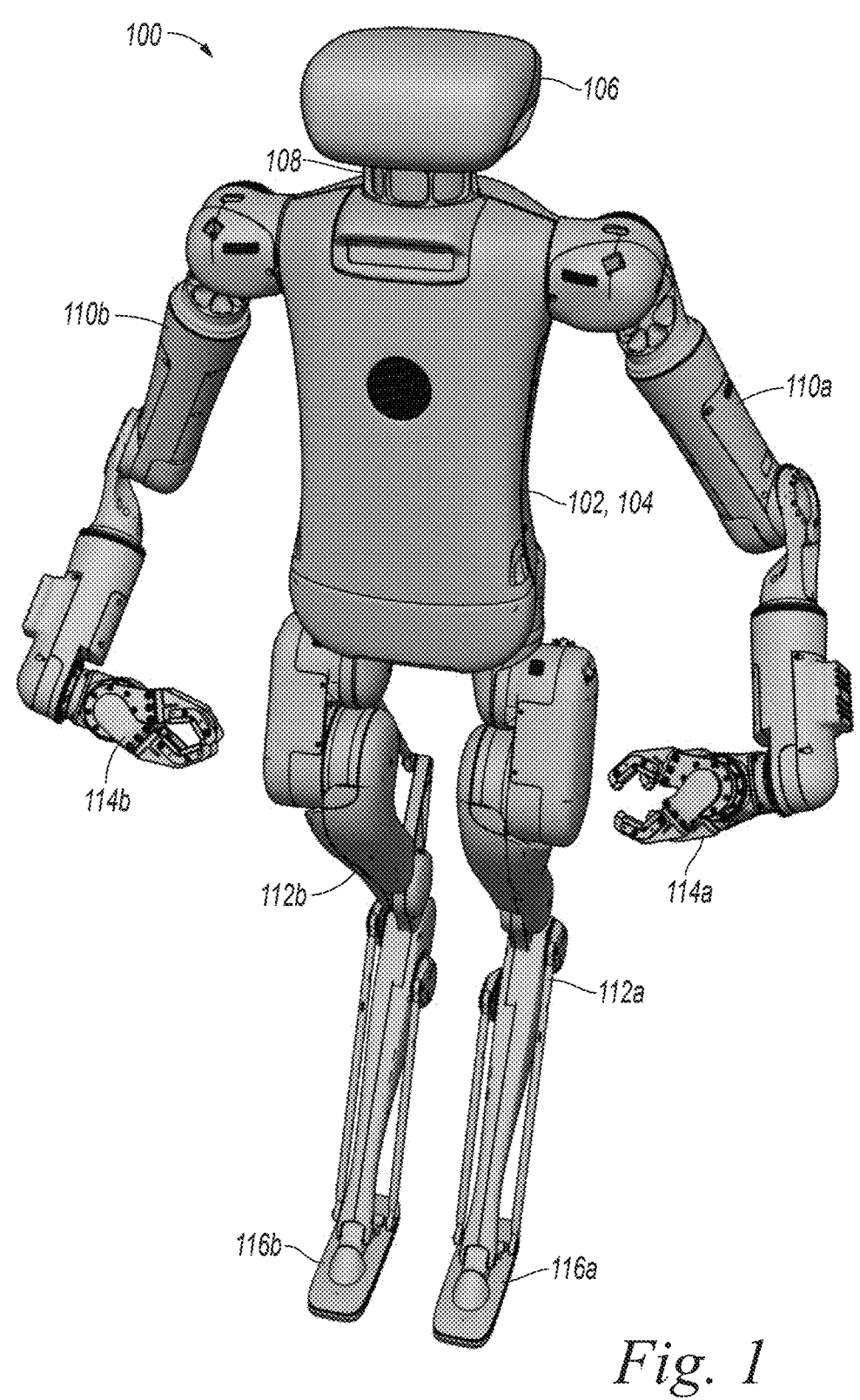
FIG. 1 is a perspective view of a mobile robot in accordance with at least some embodiments of the present technology.

Disclosed herein are methods, devices, and systems related to object placing via a mobile robot including nudging and related technology. Methods in accordance with at least some embodiments of the present technology include innovative combinations of features that promote one or more useful objectives. Such objectives include improving the precision, accuracy, and/or speed of object placement via a mobile robot. In addition or alternatively, features in accordance with at least some embodiments of the present technology reduce or eliminate the need for human intervention in object-manipulation protocols intended to be carried out at least primarily via mobile robots. In an example, nudging an object via a finger of a mobile robot in conjunction with placing the object can reduce or eliminate the occurrence of stalling at an inlet of a port or conveyor at an order-fulfillment center. Objects that should ordinarily move by gravity or by motorized conveyance may stall unexpectedly for many reasons, including placement imprecision, obstructions, object irregularities, etc. In some cases, stalled objects delay object movements not only for the stalled objects themselves but also for other objects that use the same channels of conveyance. A stalled object can even cause a cascade of disruptions in one or more object flow patterns. As another example, nudging an object via a finger of a mobile robot in conjunction with placing the object can facilitate packing the object with other objects with little or no space between the objects. Tightly packing objects in this way can be useful, for example, to increase the stability, compactness, and dimensional predictability of object bundles, such as palletized object bundles. Other objectives associated with at least some embodiments of the present technology will be apparent to a person of ordinary skill in the art in view of this disclosure as a whole.

A method in accordance with at least some embodiments of the present technology includes carrying an object between opposable fingers of a mobile robot and then nudging the object via one of the opposable fingers while the other of the opposable fingers is out of contact with the object. In these and other cases, the mobile robot can rapidly and reliably transition from one or more coarse object-manipulation processes to one or more fine object-manipulation processes. For example, a mobile robot may place an object at an inlet to a chute with loose placement tolerances characteristic of object-manipulation processes that promote speed over precision. The mobile robot may then urge the object to move down the chute via a different object-manipulation process that promotes precision over speed. Nudging, therefore, can at least partially compensate for the problem of occasional object stalling due to placement imprecision in high-throughput object-manipulation processes.

As another example, a mobile robot may place an object at an approximate placing location and then nudge the object toward another, more desirable placing location. As discussed below, this nudging and other nudging disclosed herein can be in any suitable direction, not just forward. Furthermore, the mobile robot may sense resistance via a nudging finger with greater sensitivity than would be possible while the mobile robot grips the object between gripping fingers. Among other things, this can facilitate moving an object into abutment with another object without displacing the other object. As yet another example, differential timing, force (pushing and/or pulling), displacement, and/or other aspects of nudging via different respective fingers of the same end effector or of different end effectors can cause an object to move laterally, diagonally, and/or straight as needed to achieve a desired final position. In these and other cases, a mobile robot can control nudging based on information, such as resistance information from a force sensor, resistance information from backdriving an actuator, vision information from a vision sensor, etc.

The foregoing and many other features of methods, devices, and systems in accordance with various embodiments of the present technology are further described below with reference to FIGS. 1-38. Although methods, devices, and systems may be described herein primarily or entirely in the context of bimanual, bipedal, mobile robots moving totes and boxes, other contexts are within the scope of the present technology. For example, suitable features of described methods, devices, and systems can be implemented in the context of mobile robots with one arm, in the context of mobile robots with more than two arms, and/or in the context of non-legged mobile robots. Similarly, suitable features of described methods, devices, and systems can be implemented in the context of moving objects other than totes and boxes, such as crates, non-packaged hard goods, irregularly shaped objects, etc. Furthermore, it should be understood, in general, that other methods, devices, and systems in addition to those disclosed herein are within the scope of the present technology. For example, methods, devices, and systems in accordance with embodiments of the present technology can have different and/or additional configurations, components, procedures, etc. than those disclosed herein. Moreover, methods, devices, and systems in accordance with embodiments of the present technology can be without one or more of the configurations, components, procedures, etc. disclosed herein without deviating from the present technology.

Examples of Mobile Robots

FIG. 1 is a perspective view of a mobile robot 100 in accordance with at least some embodiments of the present technology. As shown in FIG. 1, the mobile robot 100 can include structures resembling human anatomy with respect to the features, positions, or other characteristics of such structures. In at least some cases, the mobile robot 100 defines a midsagittal plane about which the mobile robot 100 is bilaterally symmetrical. In these and other cases, the mobile robot 100 can be configured for bipedal locomotion similar to that of a human. Counterparts of the mobile robot 100 can have other suitable forms and features. For example, a counterpart of the mobile robot 100 can have a non-humanoid form, such as a canine form, an insectoid form, an arachnoid form, or a form with no animal analog. Furthermore a counterpart of the mobile robot 100 can be asymmetrical or have symmetry other than bilateral. Still further, a counterpart of the mobile robot 100 can be configured for non-bipedal locomotion. For example, a counterpart of the mobile robot 100 can be configured for another type of legged locomotion (e.g., quadrupedal locomotion, hexapedal locomotion, octopedal locomotion, etc.) or non-legged locomotion (e.g., wheeled locomotion, continuous-track locomotion, etc.).

With reference again to FIG. 1, the mobile robot 100 can include a centrally disposed body 102 through which other structures of the mobile robot 100 are interconnected. As all or a portion of the body 102, the mobile robot 100 can include a torso 104. The mobile robot 100 can further include a head 106 superiorly spaced apart from the torso 104. The mobile robot 100 can also include a neck 108 through which the head 106 is connected to the torso 104 via a superior portion of the torso 104. The mobile robot 100 can further include articulated appendages carried by the torso 104. Among these articulated appendages, the mobile robot 100 can include arms 110 (individually identified as arms 110a, 110b) and legs 112 (individually identified as legs 112a, 112b). At individual articulations of the arms 110a, 110b and legs 112a, 112b, the mobile robot 100 can include a joint and a corresponding actuator, such as a rotary actuator with a motor and gearing (e.g., cycloidal gearing or strain-wave gearing). For clarity of illustration, the joints and actuators are not labeled in FIG. 1.

In at least some cases, the mobile robot 100 is configured to manipulate objects via the arms 110a, 110b, such as bimanually. In these and other cases, the mobile robot 100 can be configured to ambulate via the legs 112a, 112b, such as bipedally. Thus, the mobile robot 100 can be bimanual and bipedal. The arms 110a, 110b and the legs 112a, 112b can separately extend from the body 102 and define respective kinematic chains. In at least some cases, the respective kinematic chains corresponding to the arms 110a, 110b provide at least five degrees of freedom, such as exactly five or exactly six degrees of freedom. In these and other cases, the respective kinematic chains corresponding to the legs 112a, 112b can provide at least four degrees of freedom, such as exactly four, exactly five, or exactly six degrees of freedom. As parts of the arms 110a, 110b, the mobile robot 100 can include end effectors 114a, 114b at distalmost portions of the corresponding kinematic chains. Similarly, as parts of the legs 112a, 112b, the mobile robot 100 can include feet 116a, 116b at distalmost portions of the corresponding kinematic chains. Thus, the arms 110a, 110b and legs 112a, 112b can distally carry the end effectors 114a, 114b and the feet 116a, 116b, respectively.

Figure 2:
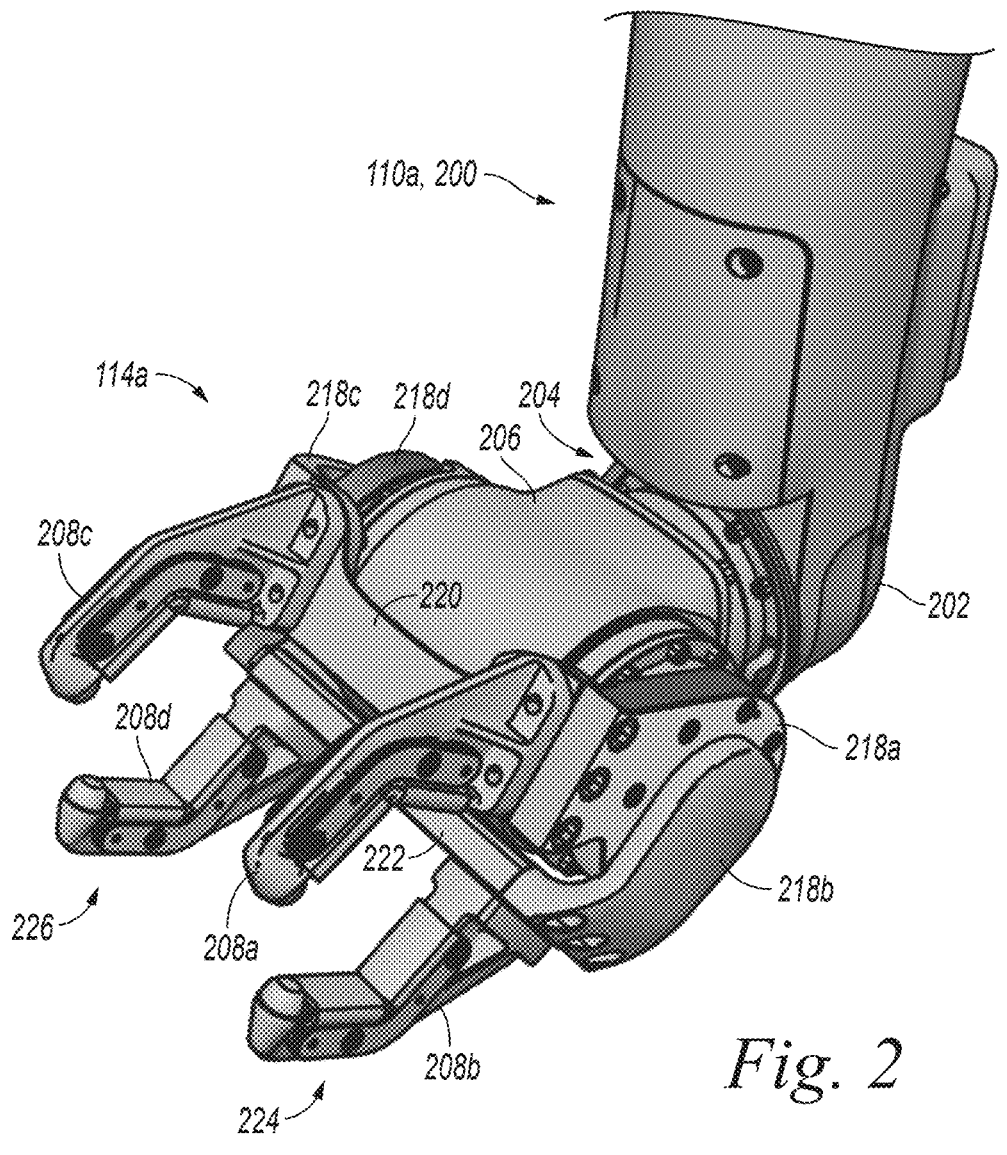
FIGS. 2 and 3 are different respective perspective views of an end effector and a distal end portion of an arm of the mobile robot of FIG. 1.
Figure 3:
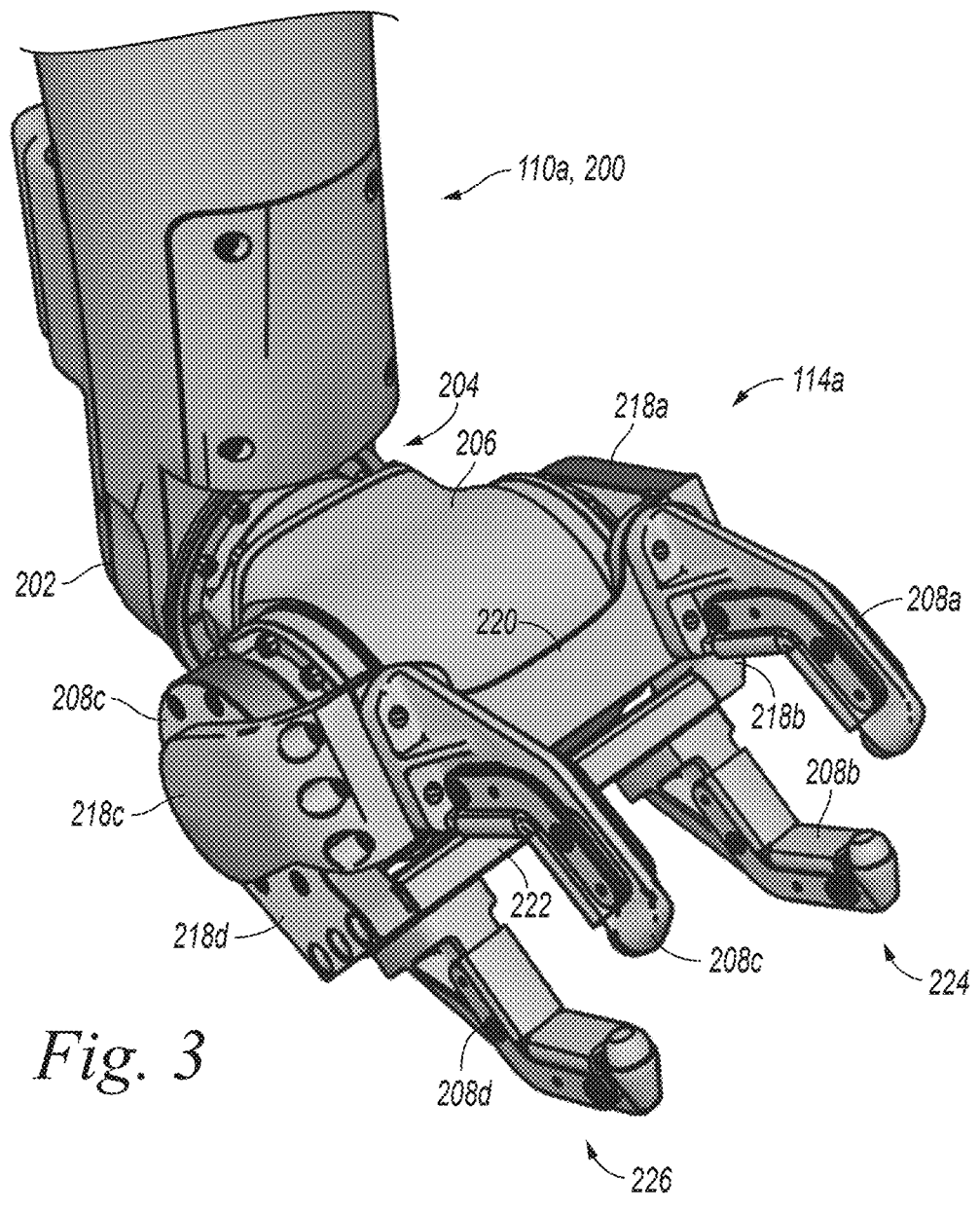
Figure 4:
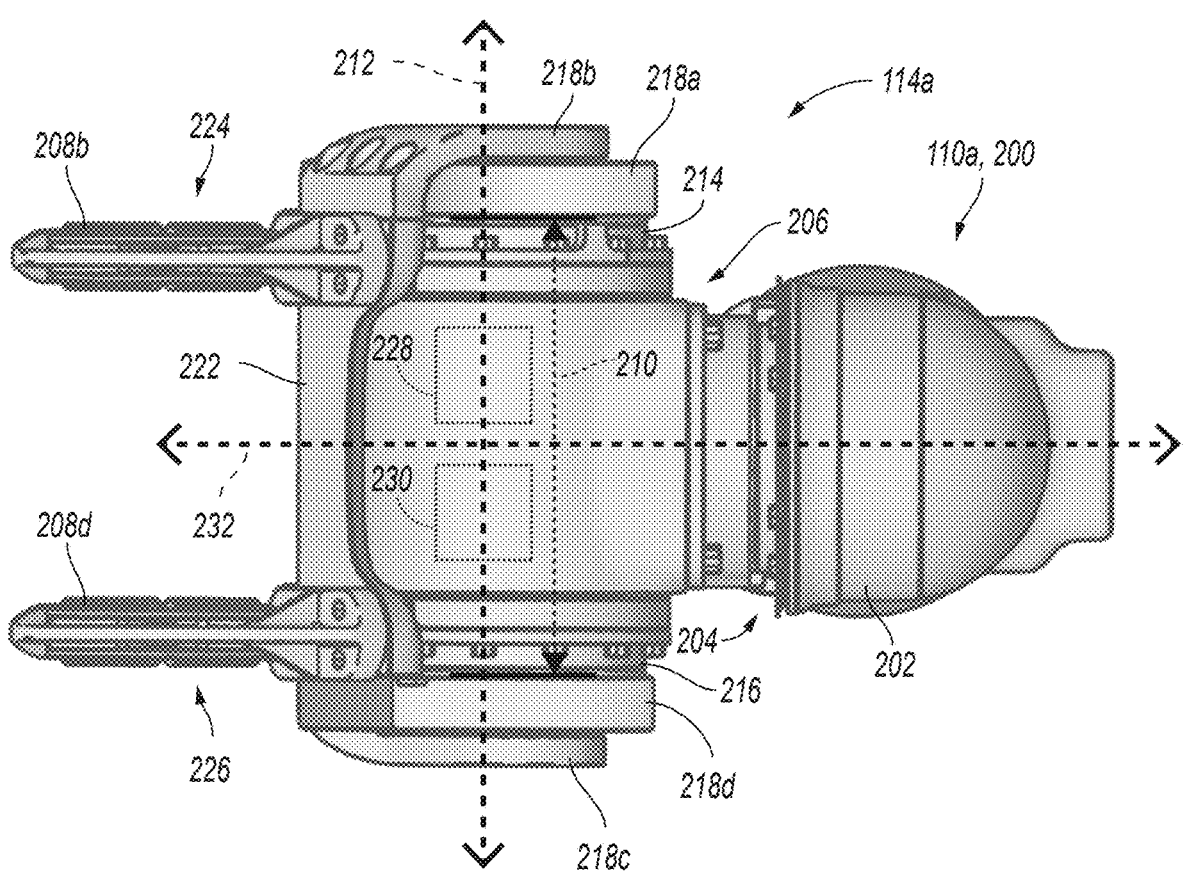
FIG. 4 is a bottom plan view of the end effector and the distal end portion of the arm of the mobile robot of FIG. 1.

FIGS. 2 and 3 are different respective perspective views of the end effector 114*a* and a distal end portion of the arm 110*a*. FIG. 4 is a bottom plan view of the end effector 114*a* and the distal end portion of the arm 110*a*. In at least some cases, the end effector 114*b* and the distal end portion of the arm 110*b* have features of the end effector 114*a* and the distal end portion of the arm 110*a* as shown in FIGS. 2-4 and as described herein, but mirrored about the midsagittal plane of the mobile robot 100. Features of the end effector 114*b* or of the distal end portion of the arm 110*b* may be referred to herein using the same reference numbers as the corresponding features of the end effector 114*a* or of the distal end portion of the arm 110*a*, but with an appended prime symbol. With reference now to FIGS. 2-4, the arm 110*a* can include a forearm link 200 with a distal end portion 202. At its distal end portion 202, the forearm link 200 can define a notch 204. The end effector 114*a* can connect to the forearm link 200 via the notch 204.

In at least some cases, the end effector 114*a* includes a base 206 and fingers 208 (individually identified as fingers 208*a*-208*d*) connected to the base 206. The base 206 can define a width 210 along an axis 212 and can include a first side portion 214 and a second side portion 216 spaced apart from one another along the axis 212 by the width 210. The end effector 114*a* can further include connectors (individually identified as connectors 218*a*-218*d*) through which the fingers 208*a*-208*d* are rotatably connected, respectively, to the base 206. In the illustrated embodiment, the end effector 114*a* further includes a first strut 220 through which the fingers 208*a*, 208*c* are fixedly connected to one another and are rotatably connected to the base 206. Also in the illustrated embodiment, the end effector 114*a* includes a second strut 222 through which the fingers 208*b*, 208*d* are fixedly connected to one another and are rotatably connected to the base 206. In a counterpart of the end effector 114*a*, the fingers 208*a*-208*d* can be independently connected to the base 206 and independently rotatable relative to the base 206. For example, in a counterpart of the end effector 114*a*, a portion of the first strut 220 extending between the fingers 208*a*, 208*c* can be eliminated. Similarly, a portion of the second strut 222 extending between the fingers 208*b*, 208*d* can be eliminated.

With reference again to the illustrated embodiment, the fingers 208*a*, 208*b* can be opposably associated with one another within a first pincer 224 of the end effector 114*a*. Similarly, the fingers 208*c*, 208*d* can be opposably associated with one another within a second pincer 226 of the end effector 114*a*. As mentioned above, the fingers 208*a*-208*d* can be rotatably connected to the base 206. The end effector 114*a* can include a first rotary actuator 228 (shown schematically in FIG. 4) configured to move the fingers 208*a*, 208*c* relative to the base 206. The end effector 114*a* can likewise include a second rotary actuator 230 (also shown schematically in FIG. 4) configured to move the fingers 208*b*, 208*d* relative to the base 206. The first and second rotary actuators 228, 230 can be symmetrically disposed at the base 206 about a plane of symmetry 232 within 10 degrees of perpendicular to the axis 212. In these and other cases, the first and second rotary actuators 228, 230 can be disposed in a back-to-back arrangement such that actuating the fingers 208*a*-208*d* occurs via the first and second side portions 214, 216 of the base 206. The connectors 218*a*, 218*b* can be in an overlapping configuration at the first side portion 214 of the base 206. For example, the connector 218*a* can be between the connector 218*b* and the first side portion 214 of the base 206 along the axis 212. Similarly, the connectors 218*c*, 218*d* can be in an overlapping configuration at the second side portion 216 of the base 206. For example, the connector 218*d* can be between the second side portion 216 of the base 206 and the connector 218*c* along the axis 212. Together, the connectors 218*a*, 218*c* and the first strut 220 can form a first yoke carrying the fingers 208*a*, 208*c* while the connectors 218*b*, 218*d* and the second strut 222 together form a second yoke carrying the fingers 208*b*, 208*d*. These first and second yokes can be interdigitated about the base 206.

In the illustrated embodiment, the first rotary actuator 228 is configured to actuate the fingers 208*a*, 208*c* via the connector 218*a*. Similarly, the second rotary actuator 230 is configured to actuate the fingers 208*b*, 208*d* via the connector 218*d*. The connectors 218*b*, 218*c*, in contrast, are passively connected to the base 206. Thus, the connector 218*c* is actuated via the connector 218*a* and the first strut 220. Similarly, the connector 218*b* is actuated via the connector 218*d* and the second strut 222. As mentioned above, in other embodiments, the fingers 208*a*-208*d* can be independently rotatable about the base 206. Furthermore, in a counterpart of the end effector 114*a*, the connectors 218*a*-218*d* can be directly actuated. For example, third and fourth rotary actuators can be disposed at the base 206 (e.g., inline with the first and second rotary actuators 228, 230) and operably associated with the connectors 218*b*, 218*c*, respectively. In another counterpart of the end effector 114*a*, one, some, or all of the fingers 208*a*-208*d* can be independently actuated via motors proximal to the base 206 and rods or cables extending between the motors and the fingers 208*a*-208*d*. In yet another counterpart of the end effector 114*a*, one, some, or all of the fingers 208*a*-208*d* can be actuated pneumatically or hydraulically.

Examples of Electrical, Computer, and Software Systems

Figure 5:
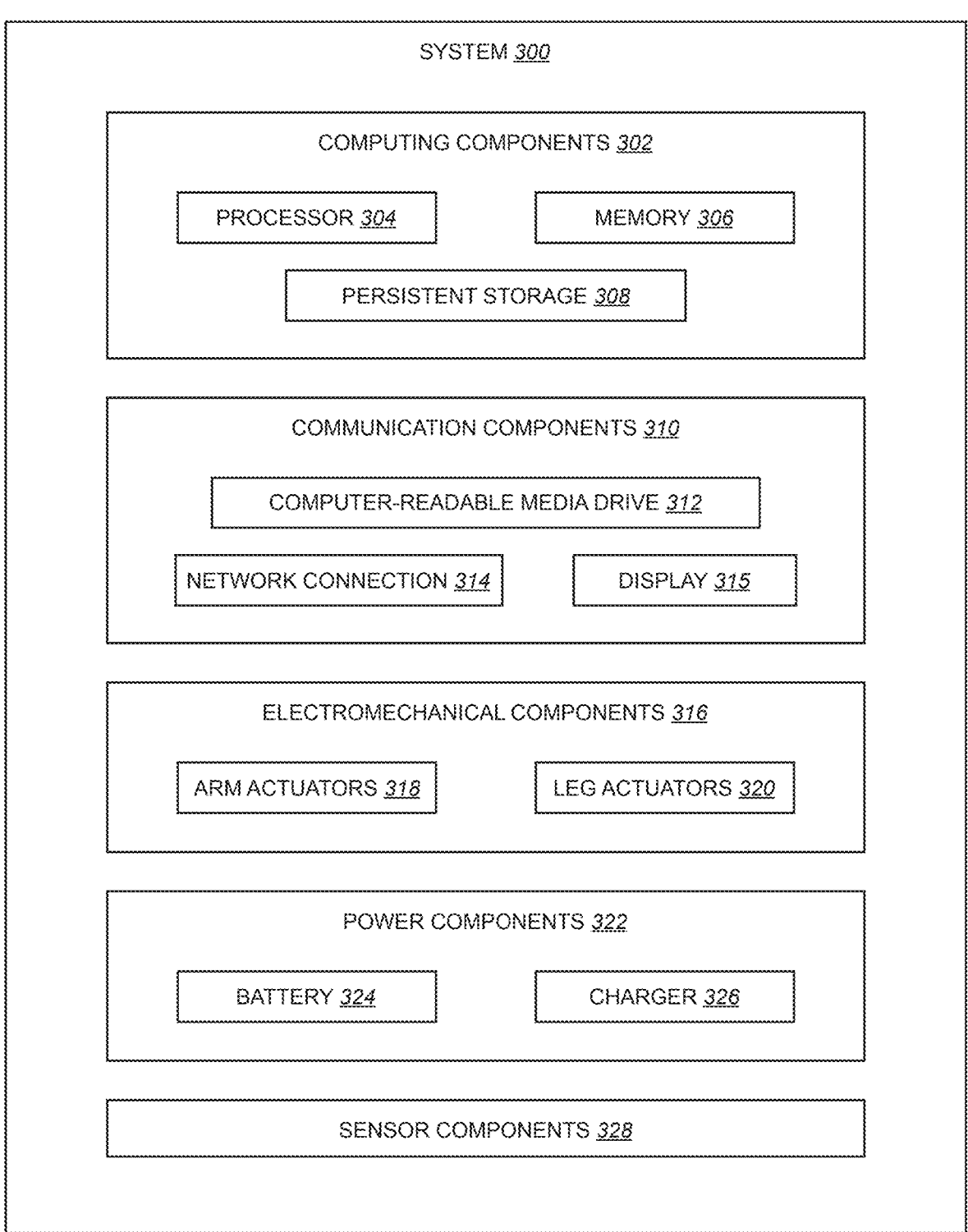
FIG. 5 is a block diagram depicting a system including electrical, computer, and software features operably associated with the mobile robot of FIG. 1.

When suitable, operations described elsewhere in this disclosure can be implemented at least partially via the devices and systems disclosed in this section. FIG. 5 is a block diagram depicting a system 300 including electrical, computer, and software features operably associated with the mobile robot 100. As shown in FIG. 5, the system 300 can include computing features 302. The computing features 302 can include a processor 304, such as one or more general-purpose or special-purpose integrated circuits including digital logic gates for executing programs or for otherwise processing data. The computing features 302 can further include memory 306, such as one or more integrated circuits for storing data in use. The memory 306 can include a multithreaded program, an operating system including a kernel, device drivers, etc. The computing features 302 can further include persistent storage 308, such as a hard drive for persistently storing data. Examples of data that can be stored by the persistent storage 308 include diagnostic data, sensor data, configuration data, environmental data, and current-state data. The computing features 302 can collectively define a computer configured to manage, control, receive information from, deliver information to, and/or otherwise usefully interact with other features of the system 300.

The system 300 can further include communication features 310. The communication features 310 can include a computer-readable media drive 312 for reading computer programs and/or other data stored on computer-readable media. As one example, the computer-readable media drive 312 can be a flash-memory drive. The communication features 310 can further include a network connection 314 for connecting the mobile robot 100 to other devices and systems, such as other mobile robots and/or other computer systems. The network connection 314 can be wired or wireless and can be via the Internet, a Local Area Network (LAN), a Wide Area Network (WAN), BLUETOOTH®, Wi-Fi®, a cellular-phone network, etc. The network connection 314 can include networking hardware, such as routers, switches, transmitters, receivers, computer-readable transmission media, etc. The communication features 310 can further include a display 315 (e.g., a touchscreen) and/or other suitable features for communicating with a user. The mobile robot 100 can use the communication features 310 for internal and/or external operations. Examples of these operations include interacting with systems that provide contextual information about the environment in which the mobile robot 100 operates and interacting with systems for changing operating conditions of the mobile robot 100.

Figure 6:
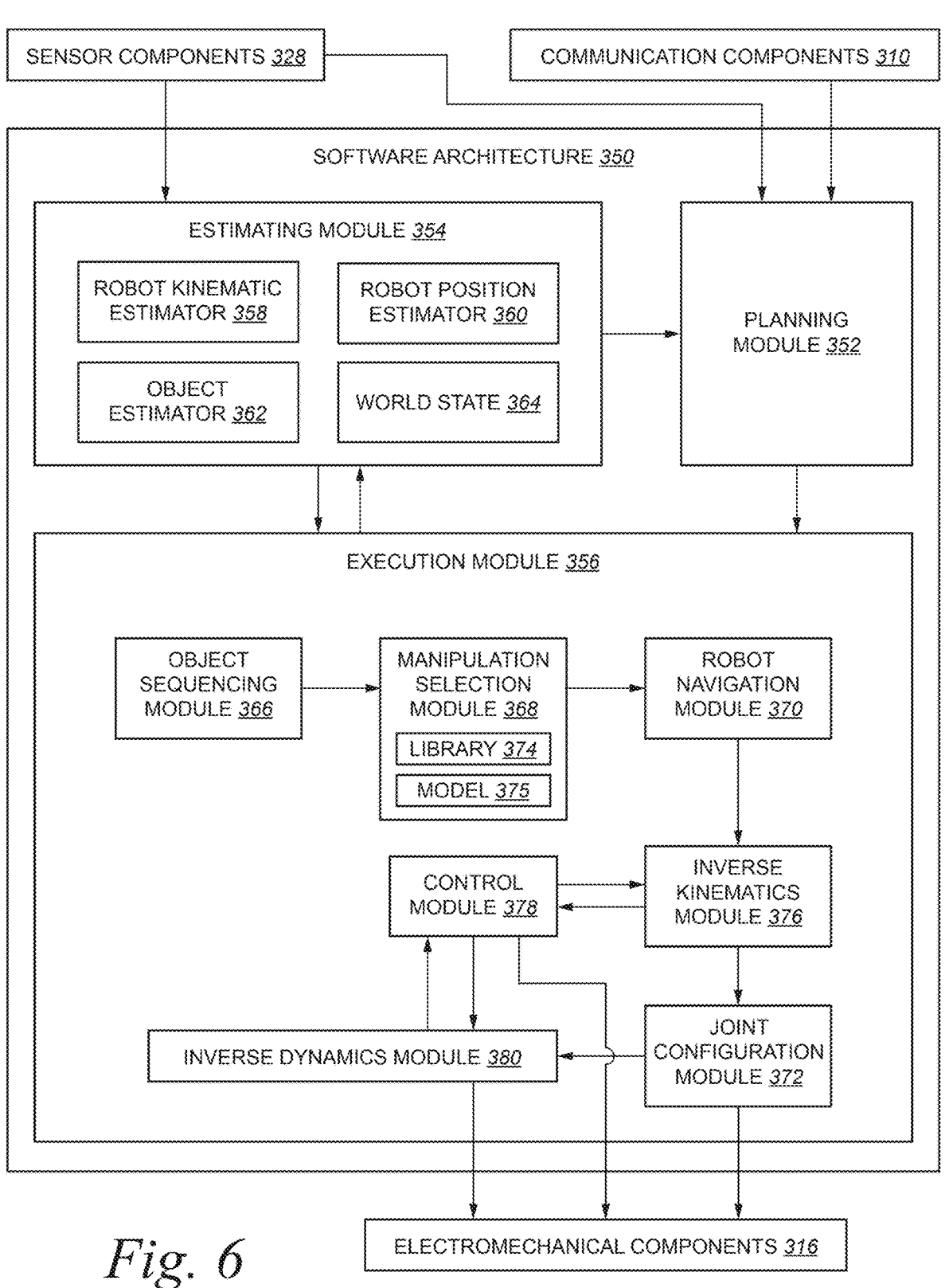
FIG. 6 is a block diagram depicting software architecture and associated portions of the system of FIG. 5.

The system 300 can further include electromechanical features 316. The electromechanical features 316 can include arm actuators 318 and leg actuators 320 at joints of the arms 110*a*, 110*b* and legs 120*a*, 120*b*, respectively, as discussed above. In addition or alternatively, the electromechanical features 316 can include other suitable features for implementing mechanical action within the mobile robot 100. As shown in FIG. 6, the system 300 can further include power features 322, such as a battery 324 and a charger 326. The battery 324 can be a lithium-ion battery, a sodium-ion battery, a lead-acid battery, or a battery of another suitable type. The charger 326 can include a connector (not shown) compatible with a power source (e.g., a wall outlet, a charging station, etc.) and leads (not shown) extending between the connector and the battery 324. In at least some cases, the mobile robot 100 is configured to operate wirelessly via the battery 324 and to recharge via the charger 326.

Finally, the system 300 can include sensor features 328 for capturing, providing, and/or analyzing information about the mobile robot 100 itself and/or the environment in which the mobile robot 100 operates. The sensor features 328 can include a vision sensor (e.g., a camera), a light sensor (e.g., a photoresistor), a sound sensor (e.g., a microphone), a location sensor (e.g., a Global Positioning System (GPS) sensor), a two-dimensional sensor, a three-dimensional sensor, and/or a proximity sensor, among other examples. Within the body 102 and/or at one or more other suitable locations, the mobile robot 100 can include among the sensor features 328, an accelerometer, a gyroscope, a magnetometer, and/or a tilt sensor, among other examples. At the end effectors 114*a*, 114*b*, at the feet 116*a*, 116*b*, and/or at one or more other suitable locations, the mobile robot 100 can include among the sensor features 328, a contact sensor and/or a force sensor. In at least some cases, two or more different types of sensors are incorporated into a sensor assembly of the mobile robot 100. For example, an accelerometer, a gyroscope, and a magnetometer can be incorporated into an inertial measurement unit (IMU) through which the mobile robot 100 can determine parameters such as acceleration, angular velocity, and orientation. The mobile robot 100 can include an IMU within the torso 104, within the head 106, and/or at one or more other suitable locations.

At one, some, or all of the arm actuators 318, at one, some, or all of the leg actuators 320, and/or at one or more other suitable locations, the mobile robot 100 can include among the sensor features 328, sensors that measure properties of corresponding joints. Such properties can include position, orientation (e.g., yaw, pitch, and roll), applied force (e.g., torque), elevation, mass, velocity, and acceleration, among other examples. The measurements of these properties can be direct or indirect. As an example of direct sensing, the mobile robot 100 may sense a torque acting on a given joint via a torque sensor operably associated with the joint, such as a torque sensor that outputs torque as function of current. As another example of direct sensing, the mobile robot 100 may sense a position of a given joint via an encoder operably associated with the joint. Any joint described herein should be construed as potentially including a torque sensor, encoder, and/or other suitable mechanism for direct sensing. As an example of indirect sensing, the mobile robot 100 may sense a position of a given one of the end effectors 114*a*, 114*b* or other feature based on perception data corresponding to the feature and other data corresponding to a reference. The mobile robot 100 can include one or more sensors in a sensor system, such as a vision system, a LIDAR system, a stereoscopic camera system, a SONAR system, etc. In at least some cases, the mobile robot 100 monitors itself and/or its environment in real-time or in near real-time. Moreover, the mobile robot 100 may use acquired sensor data as a basis for decision-making via the computing features 302.

Features of the system 300 can be connected to one another and/or to other features of the mobile robot 100 via suitable conductors, transmitters, receivers, circuitry, etc. While the system 300 configured as described may be used to support operation of the mobile robot 100, it should be appreciated that the mobile robot 100 may be operated using devices of various types and configurations and that such devices may have various components and levels of responsibility. For example, the mobile robot 100 may employ individual computer systems and/or controllers to manage discrete aspects of its operations, such as an individual computer system or controller to perform computer vision operations, a separate computer system or controller to perform power management, etc. In some cases, the mobile robot 100 employs the system 300 to control physical aspects of the mobile robot 100 according to one or more designated rules encoded in software. For example, these rules can include minimums and/or maximums, such as a maximum degree of rotation for a joint, a maximum speed at which a link is allowed to move, a maximum acceleration rate for the feet 116*a*, 116*b*, etc. The mobile robot 100 may include any number of mechanical aspects and associated rules, which may be based on or otherwise configured in accordance with the purpose of and/or functions performed by the mobile robot 100.

Software features of the system 300 and other computer systems described herein may take the form of computer-executable instructions, such as program modules executable by the computing features 302. Generally, program modules include routines, programs, objects, data structures, or the like configured to perform particular tasks based on source data, which may be encrypted. Control scripts may be implemented via a suitable language, such as C/C++ or Python®. The functionality of the program modules may be combined or distributed in various embodiments, including in cloud-based implementations. Furthermore, certain aspects of the present technology can be embodied in special purpose computers or data processors, such as in application-specific integrated circuits (ASIC), digital signal processors (DSP), field-programmable gate arrays (FPGA), graphics processing units (GPU), many core processors, etc. specifically programmed, configured, or constructed to perform one or more computer-executable instructions. While aspects of the present technology, such as certain functions, may be described as being performed on a single device, these aspects, when suitable, can also be practiced in distributed computing environments where functions or modules are shared among different processing devices linked through a communications network such as a LAN, a WAN, or the Internet. In a distributed computing environment, program modules and other features may be located in both local and remote memory storage and in other devices, which may be in communication via one or more wired or wireless communication channels.

Aspects of the present technology may be stored or distributed on tangible computer-readable media, which can include volatile or non-volatile storage features, such as magnetically or optically readable computer media, hard-wired or preprogrammed chips (e.g., electrically erasable programmable read-only memory semiconductor chips), nanotechnology memory, or other computer-readable storage media. Alternatively, computer-implemented instructions, data structures, screen displays, and other data under aspects of the present technology may be distributed (encrypted or otherwise) over the Internet or over other networks (including wireless networks) on a propagated signal on a propagation medium (e.g., electromagnetic wave(s), sound wave(s), etc.) over a period of time. Furthermore, such data may be provided on an analog or a digital network and packet switched, circuit switched, or managed under another suitable scheme. The term computer-readable storage medium as used herein does not, however, encompass signals themselves (e.g., propagating signals) or transitory media. One of ordinary skill in the art will recognize that various features of the mobile robot 100 and other devices and systems described herein may communicate via any number of wired or wireless communication techniques and that elements of such devices and systems may be distributed rather than located in a single monolithic entity. Finally, electrical and computing aspects of systems in accordance with various embodiments of the present technology may operate in environments or according to processes other than the examples of environments and processes described herein.

Figure 7:
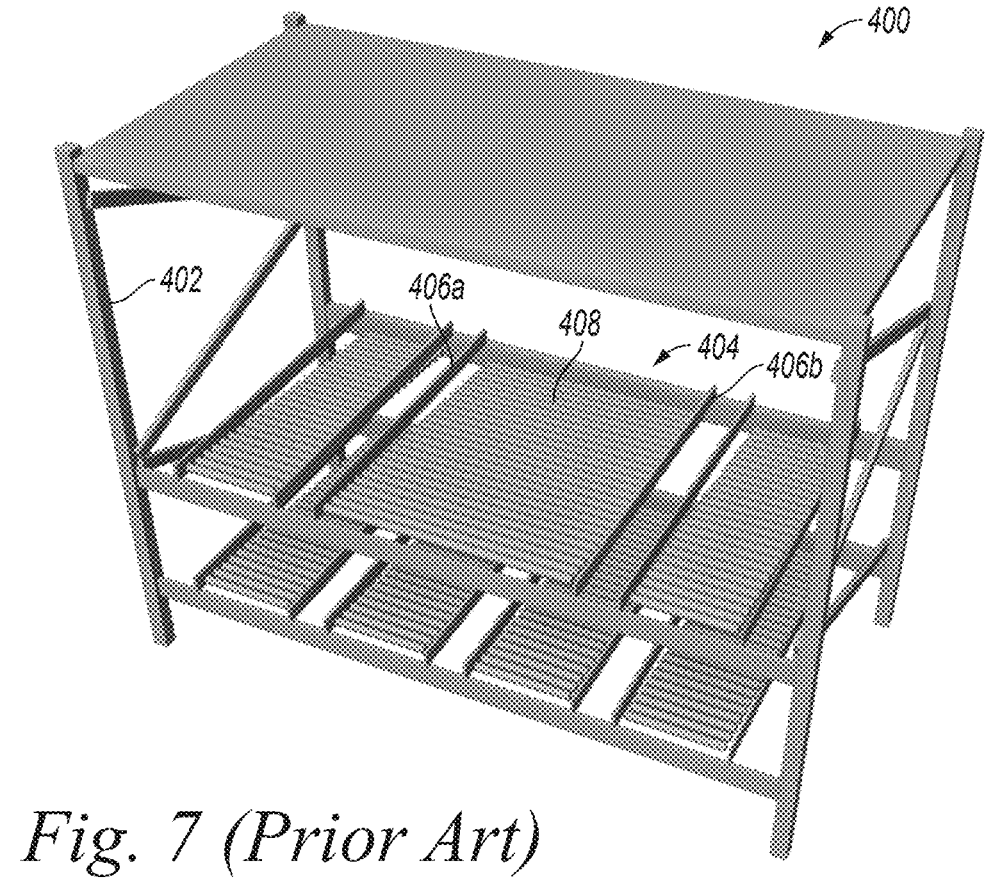
FIG. 7 is a perspective view of a rack configured to carry objects at an order-fulfillment center in accordance with the prior art.

FIG. 7 is a block diagram depicting software architecture 350 and associated portions of the system 300. The software architecture 350 can be within the memory 306 or otherwise operably associated with any or all of the various features of the system 300 as described above. With reference to FIGS. 6 and 7 together, the software architecture 350 can include a planning module 352, an estimating module 354, and an execution module 356 operably associated with one other. The planning module 352 can be configured to relay or to generate a plan corresponding to an objective for the mobile robot 100 (e.g., unload all objects on a shelf, retrieve an object from a first location and move the object to a second location, etc.). In at least some cases, the planning module 352 receives information from the communication features 310 of the system 300 and relays or generates a plan based at least partially on the received information. For example, the planning module 352 may receive a command from a user via the communication features 310 and relay the command as a plan. As another example, the planning module 352 may receive a command from a user via the communication features 310 and generate a plan related to the command. As yet another example, the planning module 352 may generate a plan without receiving a command from a user, such as at a predetermined time and/or in response to information about a current state of the mobile robot 100 or the environment received via the sensor features 328 of the system 300.

The estimating module 354 can receive information from the sensor features 328 and generate estimates in real time or in near real time to inform generating or executing a plan. The estimating module 354 can include a robot kinematic estimator 358, a robot position estimator 360, an object estimator 362, and a world state 364. The robot kinematic estimator 358 can generate an estimate of a current kinematic state of the mobile robot 100 (e.g., balanced, off-balance, walking, standing, etc.) and estimates of positions of individual joints of the mobile robot 100. The robot position estimator 360 can generate a current estimate of a position of the mobile robot 100 within an environment. This position can be a set of coordinates and can be based on perception information, GPS information, and/or other information received by or generated by the mobile robot 100. Perception information potentially relevant to the position of the mobile robot 100 includes, among other examples, information corresponding to distances between the mobile robot 100 and landmarks in an environment and information corresponding to fiducial markings (e.g., AprilTags) carried by or otherwise associated with the landmarks. This information can be detected, for example, via a camera of the mobile robot 100. Furthermore, information can move between components of the estimating module 354. For example, the world state 364 can receive information from the robot kinematic estimator 358, the robot position estimator 360, and the object estimator 362. In addition or alternatively, the object estimator 362 can receive information from the robot kinematic estimator 358 and the robot position estimator 360.

The object estimator 362 can generate a current estimate of an object (e.g., a tote) within an environment. In at least some cases, the estimate is a pose or other reference corresponding to a position and orientation of the object. As with the position of the mobile robot 100 itself, the position of an object can be a set of coordinates and can be based on perception information, GPS information, and/or other information received by or generated by the mobile robot 100. Perception information potentially relevant to the position of an object includes, among other examples, information corresponding to distances between the object and the mobile robot 100, distances between the object and landmarks in an environment, and information corresponding to fiducial markings (e.g., AprilTags) carried by or otherwise associated with the object. This information can be detected, for example, via a camera of the mobile robot 100. In at least some cases, the object estimator 362 uses information (e.g., sensor poses) from the robot kinematic estimator 358 and/or the robot position estimator 360 to inform generation of object estimates. This can be useful, for example, when a fiducial or other landmark in an environment is not visible. In at least some cases, the object estimator 362 is configured to update the world state 364 with object references and/or other information related to objects in an environment in which the mobile robot 100 operates. Furthermore, the object estimate can include an identification of an object and properties (e.g., dimensions) associated with that identification. For example, the object estimator 362 can include a machine-learning model (e.g., Detectron2 (Facebook AI Research) with Mask R-CNN implementation) that receives perception information (e.g., an image) corresponding to an object and outputs an object identification based at least partially on the perception information. The object estimator 362 can further include a lookup table for generating object properties based at least partially on this object identification.

The execution module 356 can be configured to receive a plan from the planning module 352 and estimates from the estimating module 354. The execution module 356 can include an object sequencing module 366, a manipulation selection module 368, a robot navigation module 370, and a joint configuration module 372. The planning module 352 can be configured to send a plan to the object sequencing module 366, to the manipulation selection module 368, to the robot navigation module 370, or to the joint configuration module 372 based on attributes of the plan. For example, when a plan includes explicit instructions for positions of the electromechanical features 316 of the system 300, the planning module 352 can send the plan to the execution module 356 via the joint configuration module 372. As another example, when a plan does not involve manipulating an object, the planning module 352 can send the plan to the execution module 356 via the robot navigation module 370. As yet another example, when a plan concerns only one object and the object is remote to the mobile robot 100, the planning module 352 can send the plan to the execution module 356 via the manipulation selection module 368. As a final example, when a plan concerns multiple objects remote to the mobile robot 100, the planning module 352 can send the plan to the execution module 356 via the object sequencing module 366.

The object sequencing module 366 can receive one or more estimates from the estimating module 354 and can generate a sequence in which multiple objects are to be manipulated. For example, when the object sequencing module 366 receives a plan to unload a shelf, the object sequencing module 366 can query the estimating module 354 for current locations of objects on the shelf. The object sequencing module 366 can then assign the objects an order, convert the order into a queue, and pass the queue to the manipulation selection module 368. The manipulation selection module 368 can include a library 374 including manipulation primitives and/or sequences of manipulation primitives that can be used to manipulate an object. The manipulation selection module 368 can select manipulation primitives and/or sequences for a given object based on contextual information, such as information about the object and/or information about the environment. In addition or alternatively, the manipulation selection module can include a model 375 that outputs manipulation estimates based on contextual information. The model 375 can be a machine-learning model generated by a machine-learning algorithm (e.g., a reinforcement-learning algorithm) trained on real and/or simulated contextual information. The robot navigation module 370 can generate targets for different parts of the mobile robot 100 further to a manipulation or other portions of a plan being executed. Examples of targets include positions of the feet 116a, 116b in the environment, positions of the end effectors 114a, 114b in the environment, etc. The robot navigation module 370 can update these targets continuously or near continuously based on information from the estimating module 354. The execution module 356 can further include an inverse kinematics module 376 that translates the targets from the robot navigation module 370 into joint configurations throughout the mobile robot 100.

The execution module 356 can also include a control module 378 that receives joint configurations from the inverse kinematics module 376 and generates joint parameters (e.g., positions, velocities, accelerations, etc.) to be executed by the mobile robot 100 via the electromechanical features 316 of the system 300 to achieve these joint configurations. Through continuous or near-continuous communication with the inverse kinematics module 376, the control module 378 can modify the joint parameters to at least partially compensate for deviations as the mobile robot 100 executes the joint configurations. The inverse kinematics module 376 can send other joint configurations not subject to active control to the joint configuration module 372 directly. Similar to the control module 378, the joint configuration module 372 can generate joint parameters (e.g., positions, velocities, accelerations, etc.) to be executed by the mobile robot 100 to achieve joint configurations received from the inverse kinematics module 376 or from the planning module 352.

Finally, the execution module 356 can include an inverse dynamics module 380 that receives joint parameters from the control module 378 and from the joint configuration module 372. The inverse dynamics module 380 can track a desired wrench of the mobile robot 100 and its relationship with objects in the environment. In at least some cases, the inverse dynamics module 380 references a map of robot positions and wrenches to joint torques. Based at least partially on tracking these joint torques, the inverse dynamics module 380 can modify joint parameters to achieve a desired result. For example, the inverse dynamics module 380 may modify joint parameters from the control module 378 and from the joint configuration module 372 to maintain contact between the end effectors 114a, 114b and an object as the mobile robot 100 carries the object. The inverse dynamics module 380 can then send modified joint parameters to the electromechanical features 316 of the system 300 for execution. For configurations that do not involve dynamic interaction with the environment, the control module 378 and the joint configuration module 372 can send joint parameters directly to the electromechanical features 316 for execution.

With reference to FIGS. 6 and 7 together, suitable software components disclosed herein can be part of a distributed system or component thereof or implemented as one or more network-based services. For example, a compute cluster within a computing service may present computing or storage services or other types of services that employ any distributed computing systems described herein to clients as network-based services. In some embodiments, a network-based service may be implemented by a software or hardware system designed to support interoperable machine-to-machine interaction over a network. A network-based service may have a gateway described in a machine-processable format. Other systems may interact with the network-based service in a manner prescribed by the description of the network-based service's gateway. For example, the network-based service may define various operations that other systems may invoke, and may define a particular application programming interface (API) to which other systems may be expected to conform when requesting the various operations. An API refers to an interface or other communication protocol between a client and a server, such that if the client makes a request in a predefined format, the client should receive a response in a specific format or initiate a defined action. In the cloud provider network context, APIs may provide a gateway for customers to access cloud infrastructure by allowing customers to obtain data from and/or to cause actions within the cloud provider network, enabling the development of applications that interact with resources and services hosted in the cloud provider network. APIs can also enable different services of the cloud provider network to exchange data with one another.

In a distributed system, some or all of the software architecture 350 and other software described herein can be executed remotely from the mobile robot 100. For example, the mobile robot 100 can be configured to collect raw sensor data via the sensor features 328 of the system 300 and to transmit some or all of this raw sensor data to a remote server in real time or near real time for processing. The mobile robot 100 can then receive joint commands and/or other products of this processing via communication with the server. In these and other cases, computing operations can be allocated among local and remote computing systems depending on factors such as computing demand, available computing resources, time sensitivity of computing products, etc. Moreover, even the sensor features 328 can be remote from the mobile robot 100 in certain cases. For example, a remote sensor may track its reference frame relative to a local sensor of the mobile robot 100 and may communicate that reference frame with sensor data it collects at any given time. A server receiving the sensor data can then use the relationship between the reference frame of the local sensor and the reference frame of the remote sensor to generate output in a reference frame compatible with processes that rely on sensor data from the local sensor only. Alternatively, in a non-distributed system, all information processing and command execution can occur locally at the mobile robot 100 or other local hardware depending on the implementation.

Examples of Methods

FIG. 7 is a perspective view of a rack 400 configured to carry objects at an order-fulfillment center in accordance with the prior art. Methods in accordance with embodiments of the present technology may be described herein in the context of the rack 400. The rack 400 can be part of an automated system in which a downstream robot (not shown) removes objects from the rack 400. It should be understood that the rack 400 is merely one example of a support structure compatible with methods in accordance with various embodiments of the present technology. These methods can also be implemented in other contexts. For example, the rack 400 can be omitted or replaced with another suitable support structure. Examples of potentially compatible support structures include shelves, tables, pallets, conveyors, carts, etc. With reference again to FIG. 7, the rack 400 can include a frame 402 and chutes 404 (one labeled) carried by the frame 402. The individual chutes 404 can include sidewalls 406 (individually identified as sidewalls 406a, 406b) and a roller bed 408 extending between the sidewalls 406a, 406b. The roller bed 408 can define a support plane angled slightly downward off horizontal to promote movement of carried objects by gravity.

Figures 8, 9, 10:
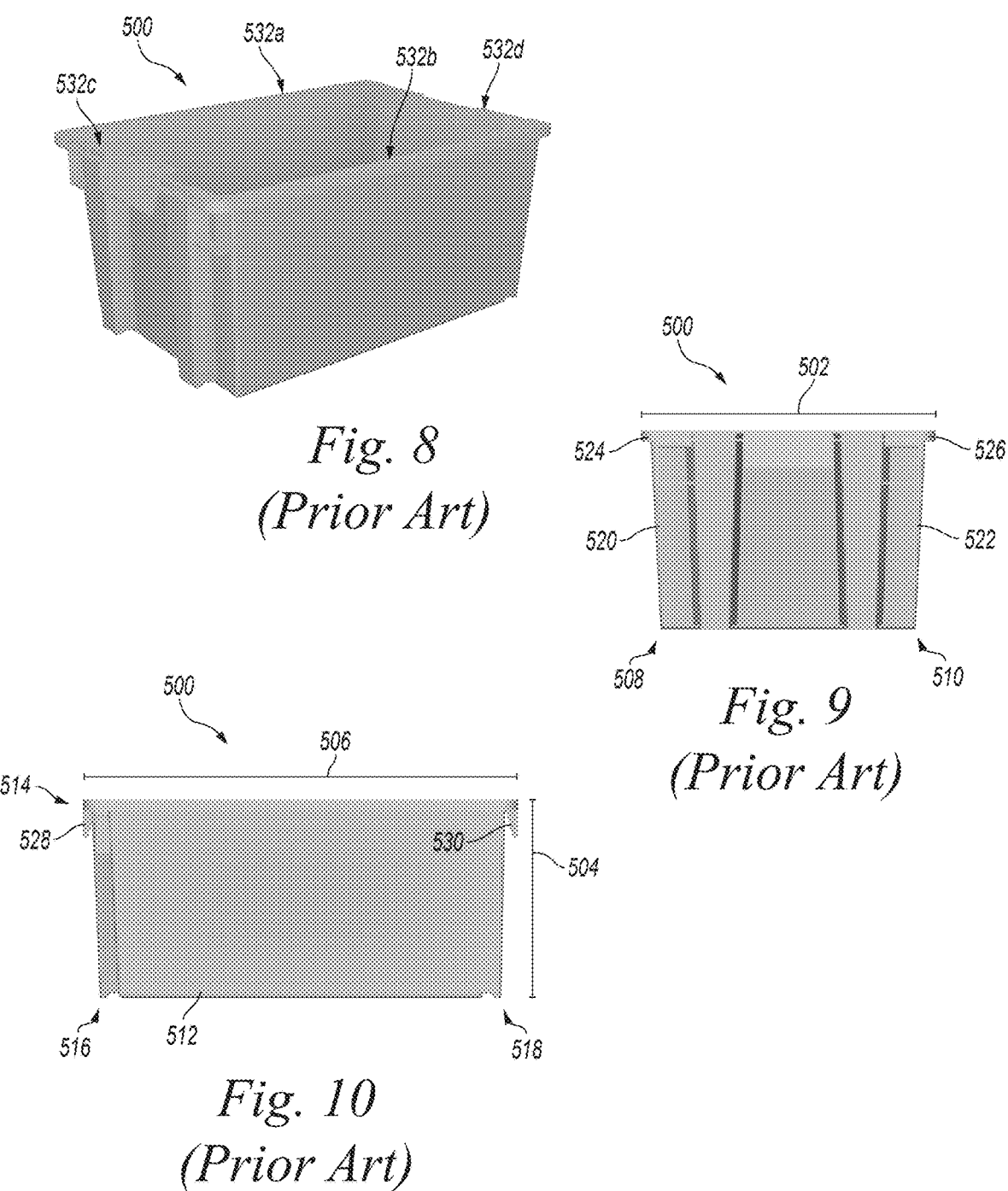
FIGS. 8, 9, and 10 are, respectively, a perspective view, a first profile view, and a second profile view of a tote in accordance with the prior art.

FIGS. 8, 9, and 10 are, respectively, a perspective view, a first profile view, and a second profile view of a tote 500 compatible with the rack 400 in accordance with the prior art. Methods in accordance with embodiments of the present technology may be described herein in the context of the tote 500. With reference to FIGS. 8-10 together, the tote 500 can define a first tote dimension 502, a second tote dimension 504, and a third tote dimension 506 perpendicular to one another. In at least some cases, the first, second, and third tote dimensions are width, height, and depth dimensions, respectively. The tote 500 can include a first side portion 508 and a second side portion 510 spaced apart from one another along the first tote dimension 502. The tote 500 can further include a bottom portion 512 and a top portion 514 spaced apart from one another along the second tote dimension 504.

The tote 500 can also include a front portion 516 and a rear portion 518 spaced apart from one another along the third tote dimension 506.

As parts of the first and second side portions 508, 510, the tote 500 can include first and second sidewalls 520, 522, respectively, and first and second protrusions 524, 526, respectively. The first and second protrusions 524, 526 can extend laterally outward from the first and second sidewalls 520, 522, respectively, at the top portion 514 of the tote 500. As parts of the front and rear portions 516, 518, the tote 500 can include first and second handles 528, 530, respectively. The first and second handles 528, 530 can likewise be at the top portion 514 of the tote 500 and can be centered along the first tote dimension 502. The first and second sidewalls 520, 522 can taper inwardly from the top portion 514 of the tote 500 toward the bottom portion 512 of the tote 500. Correspondingly, the first tote dimension 502 can decrease from the top portion 514 of the tote 500 toward the bottom portion 512 of the tote 500 along the second tote dimension 504. The top portion 514 of the tote 500 can be lidless and can define an opening (not labeled) through which the tote 500 is loaded and unloaded. Correspondingly, the tote 500 can include rims 532a-532d at the first side portion 508, the second side portion 510, the front portion 516, and the rear portion 518, respectively. In at least some cases, the tote 500 is plastic. Furthermore, the tote 500 can be with or without contents. In methods in accordance with various embodiments of the present technology described herein in the context of the tote 500, the tote 500 may be substituted with a similar object, such as a tray, a bin, a tub, or another type of container with or without a lid.

Figure 11:
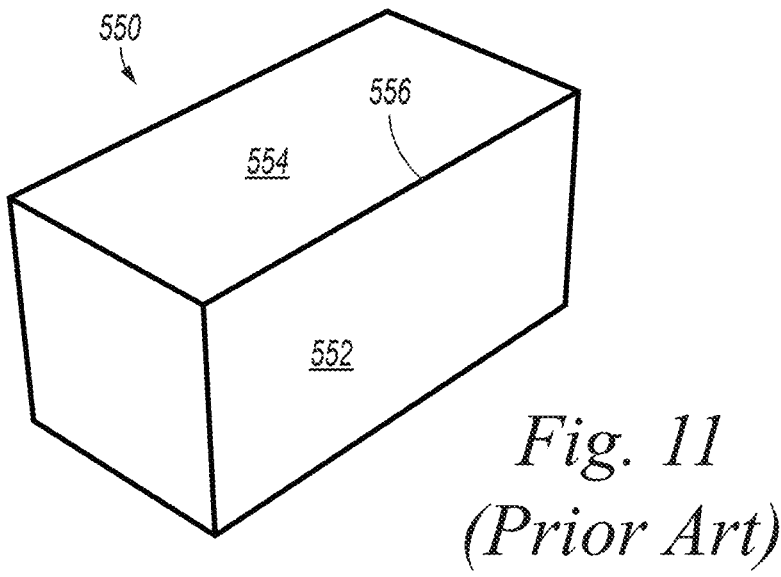
FIG. 11 is a perspective view of a box in accordance with the prior art.

FIG. 11 is a perspective view of a box 550 in accordance with the prior art. As with the tote 500 described above, methods in accordance with embodiments of the present technology may be described herein in the context of the box 550. The box 550 can be cuboid in overall form. Correspondingly, the box 550 can include a sidewall 552, an upper wall 554, and an edge 556 therebetween. In at least some cases, the box 550 is cardboard. Furthermore, the box 550 can be sealed or unsealed and with or without contents. In methods in accordance with various embodiments of the present technology described herein in the context of the box 550, the box 550 may be substituted with a similar object, such as a crate, case, a lidded tote, etc.

Figure 12:
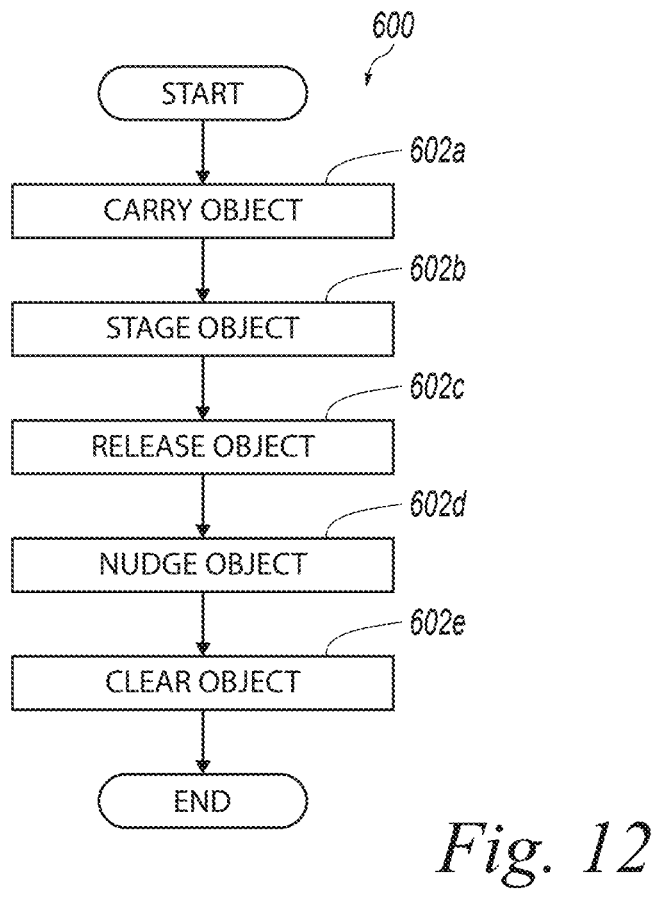
FIG. 12 is a block diagram corresponding to a method in accordance with at least some embodiments of the present technology.

FIG. 12 is a block diagram corresponding to a method 600 in accordance with at least some embodiments of the present technology. The diagram includes blocks 602a-602e corresponding to different respective portions of the method 600. FIGS. 13-25 are profile views alone or in sets of the mobile robot 100, the rack 400, and the tote 500 at successive respective times during an example of the method 600. In FIGS. 14-24, portions of the rack 400 are omitted to more clearly illustrate the mobile robot 100 and the tote 500. Examples of the method 600 will be described in the context of the mobile robot 100, the rack 400, the tote 500, and the box 550 for purposes of illustration only. It should be understood that these examples can alternatively be practiced in other contexts. Accordingly, the word "object" and specific examples of objects (e.g., the tote 500 and the box 550) may be used herein interchangeably.

Figure 13:
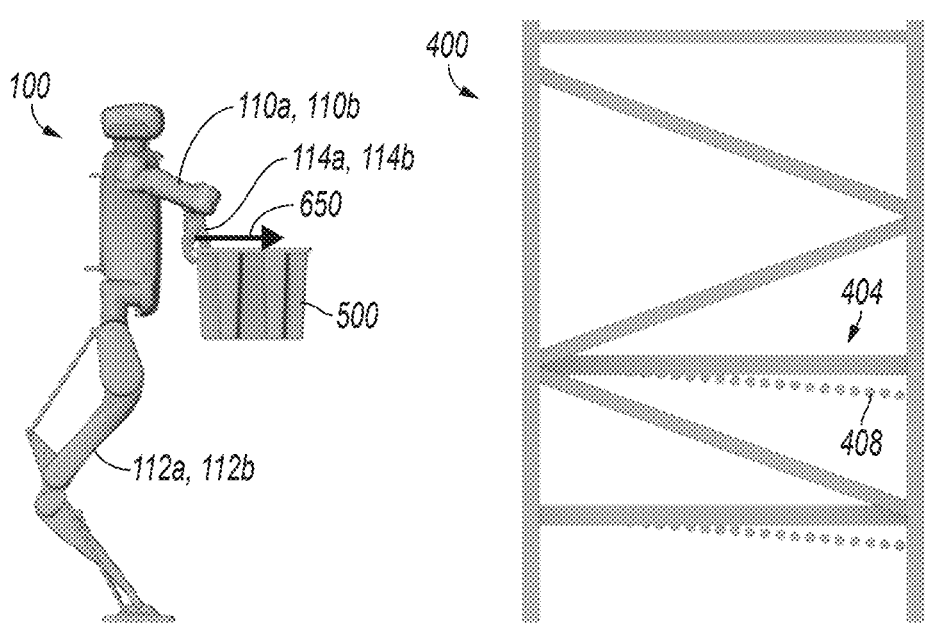
FIGS. 13-25 are profile views alone or in sets of the mobile robot of FIG. 1, the rack of FIG. 7, and the tote of FIGS. 8-10 at successive respective times during an example of the method of FIG. 12.

The method 600 can include carrying an object (block 602a). In at least some cases, this includes carrying an object while a portion of the object is disposed between at least one opposable set of the fingers 208a-208d, 208a'-208d'. For example, a first portion of the tote 500 can be disposed between the fingers 208a, 208b and a second portion of the tote 500 can be disposed between the fingers 208a', 208b' while the mobile robot 100 carries the tote 500. Alternatively or in addition, the first portion of the tote 500 can be disposed between the fingers 208a, 208b and another portion (e.g., the second portion) of the tote 500 can be disposed between the fingers 208c, 208d. The mobile robot 100 can grip the tote 500 via the both of the end effectors 114a, 114b. Alternatively, the mobile robot 100 can grip the tote 500 via only one of the end effectors 114a, 114b. As shown in FIG. 13, the first and second portions of the tote 500 that the mobile robot 100 grips can be different respective portions of the first sidewall 520 at the upper rim 532a. Carrying the tote 500 can include moving the tote 500 toward the rack 400 in the direction of arrow 650.

Figure 14:
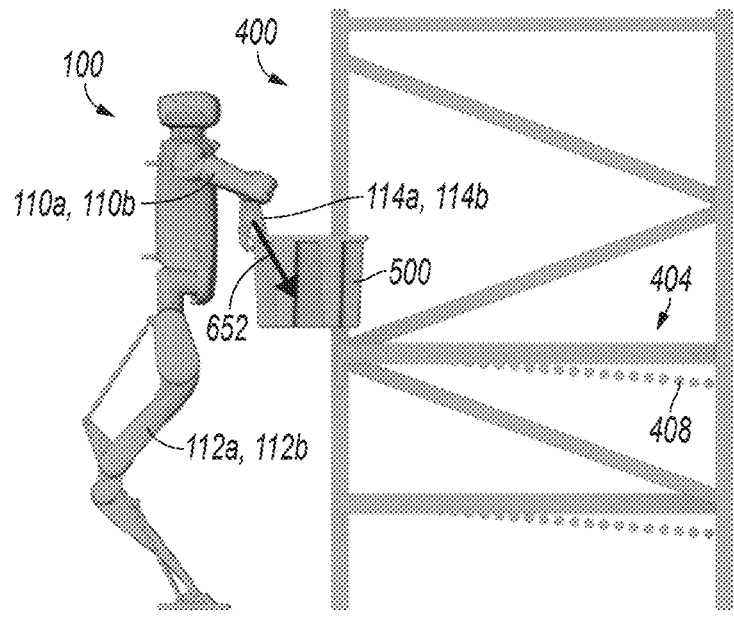
Figure 15:
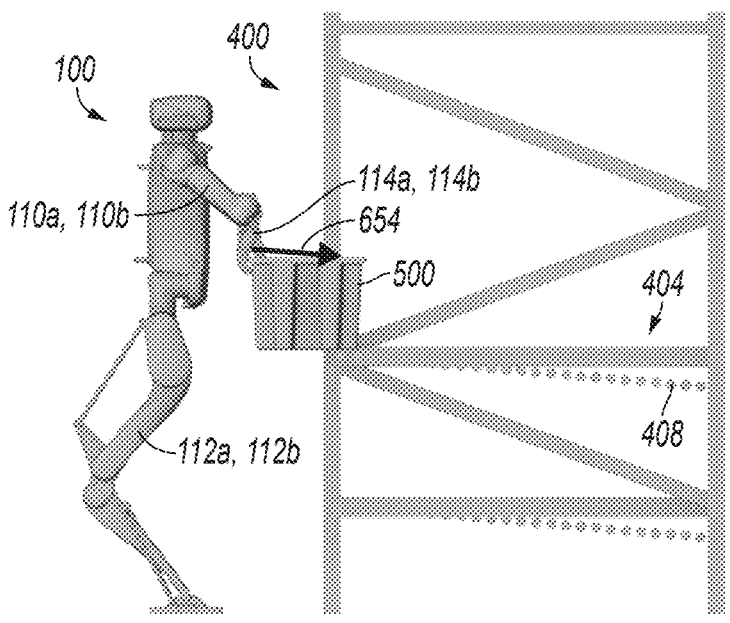
Figure 16:
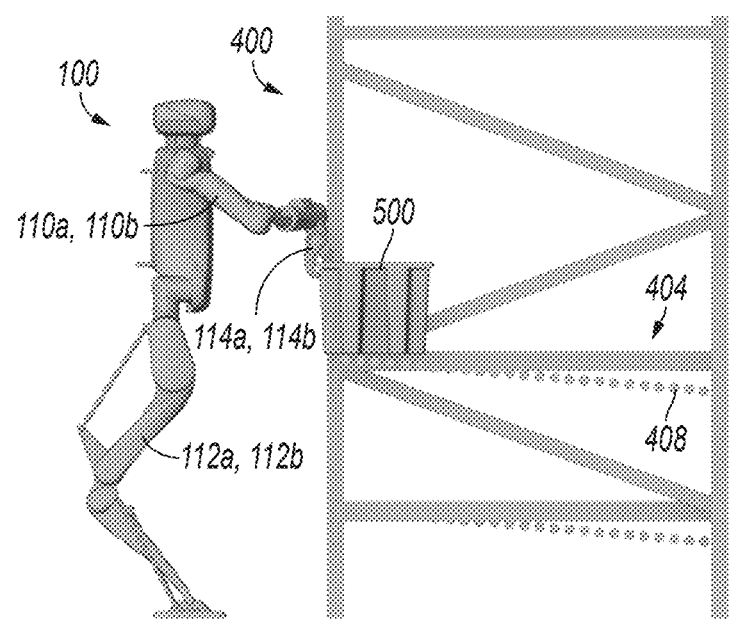
Figure 17:
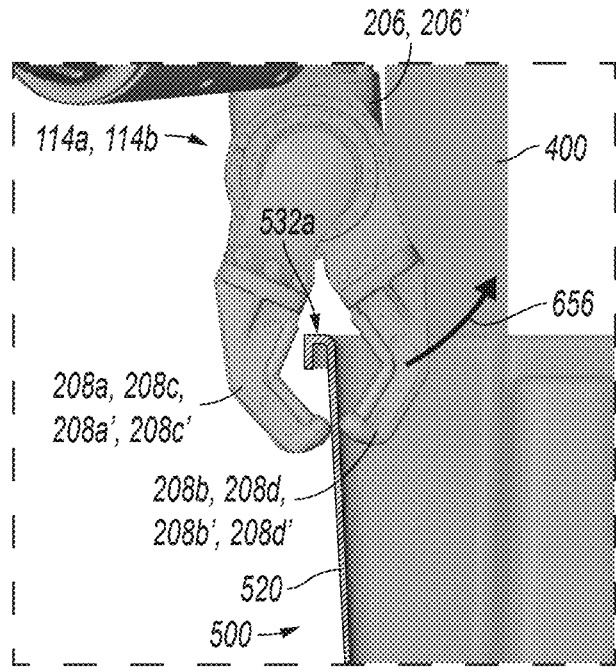

The method 600 can also include staging the object (block 602b) after carrying the object. This can include moving the object to an intermediate placing state. As shown in FIGS. 14 and 15, staging the tote 500 can include moving the tote 500 primarily downward in the direction of arrow 652 until the tote 500 contacts the roller bed 408 of a targeted one of the chutes 404. Staging the tote 500 can also include moving the tote 500 primarily forward in the direction of arrow 654. In at least some cases, this also includes moving the tote 500 primarily anteriorly relative to the torso 104. The mobile robot 100 can loosen its grip on the tote 500 after the tote 500 engages the roller bed 408. For example, the grip of the mobile robot 100 on the tote 500 may be prehensile while the mobile robot 100 carries the tote 500 and nonprehensile immediately after the mobile robot 100 stages the tote 500. FIG. 16 shows the mobile robot 100, the rack 400, and the tote 500 immediately after the mobile robot 100 stages the tote 500. FIG. 17 is a partially cross-sectional enlarged view of a detail of FIG. 16. As best shown in FIG. 17, respective distal end portions of the fingers 208a, 208c, 208a', 208c' can be in contact with an outer surface of the first sidewall 520. Similarly, respective distal end portions of the fingers 208b, 208d, 208b', 208d' can be in contact with an inner surface of the first sidewall 520. In contrast, respective intermediate portions of the fingers 208a-208d, 208a'-208d', proximal to the respective distal end portions, can be out of contact with the tote 500. The same or a similar configurations of the fingers 208a-208d, 208a'-208d' relative to the tote 500 can occur while the mobile robot 100 carries the tote 500.

The method 600 can further include releasing the object (block 602c) after staging the object. As shown in FIGS. 16-19, this can include increasing a distance between opposing pairs of the fingers 208a-208d, 208a'-208d' after moving the tote 500 to the intermediate placing state. In at least some cases, staging the tote 500 includes rotating the fingers 208b, 208d relative to the base 206 about the axis 212 in the direction of arrow 656 and rotating the fingers 208b', 208d' relative to the base 206' about the axis 212' also in the direction of arrow 656. Furthermore, increasing the distance between opposing pairs of the fingers 208a-208d, 208a'-208d' can include breaking contact between the corresponding fingers 208b, 208d, 208b', 208d' and the tote 500 during this rotation. In at least some cases, the fingers 208a, 208c, 208a', 208c' rotate less than the opposing fingers 208b, 208d, 208b', 208d' while the mobile robot 100 releases the tote 500. For example, the fingers 208a, 208c, 208a', 208c' may remain stationary. Alternatively, such as in an example of the method 600 involving nudging the tote 500 by pulling instead of pushing, the relative rotation of the opposing pairs of the fingers 208a-208d, 208a'-208d' may be reversed.

Figure 18:
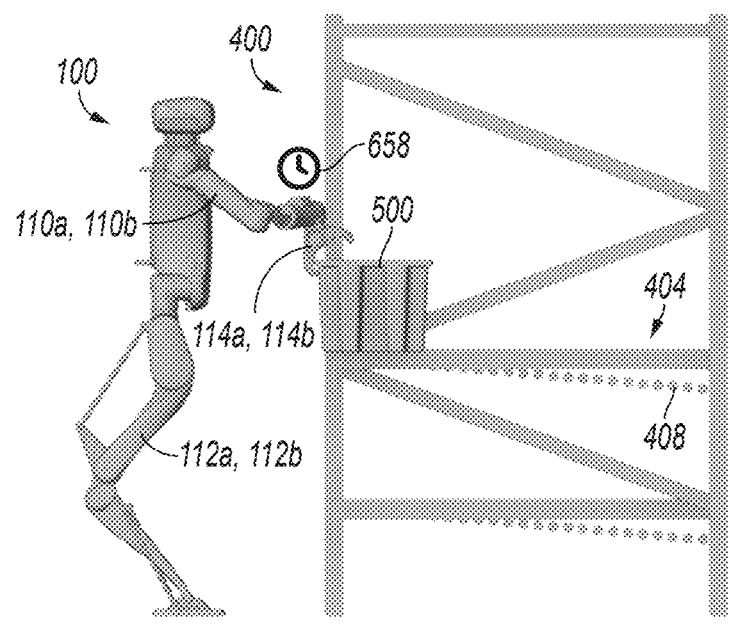
Figure 19:
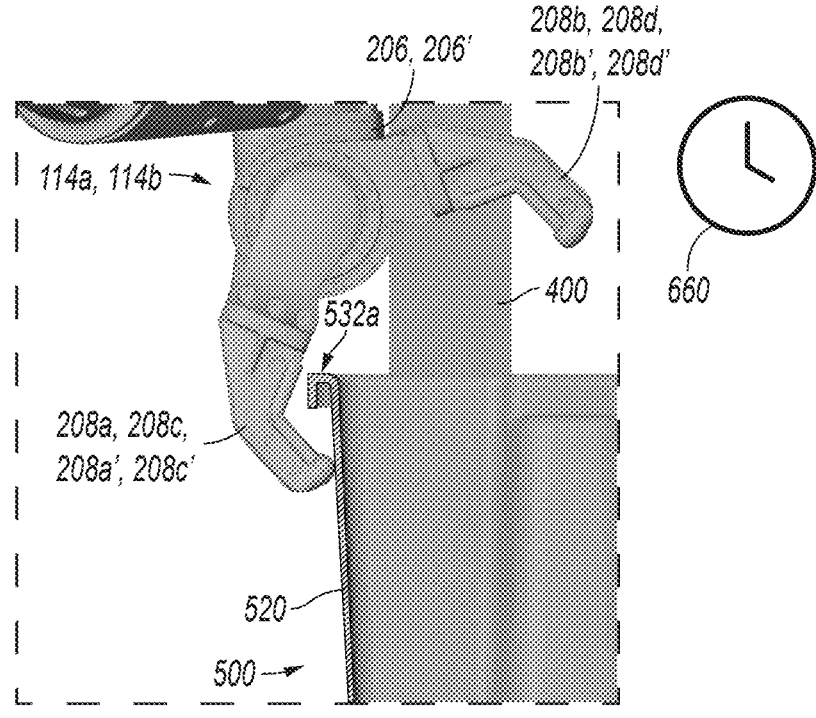

With reference again to the illustrated embodiment, FIGS. 18 and 19 show the mobile robot 100, the rack 400, and the tote 500 immediately after rotating the fingers 208b, 208d,

208b', 208d'. As shown in FIGS. 18 and 19, releasing the tote 500 can further include holding the end effectors 114a, 114b substantially stationary for a period of time represented by clock icons 658, 660. In a typical case, the slope of the roller bed 408 may be expected to cause the tote 500 to slide away from the mobile robot 100 after the mobile robot 100 releases the tote 500. Holding the end effectors 114a, 114b substantially stationary for a period of time can be useful to reduce or prevent any disruption in the initiation of this movement, such as any disruption associated with catching, hooking, collision, or other contact between any of the fingers 208a-208d, 208a'-208d' and the tote 500. In the illustrated case, however, the tote 500 still fails to slide away from the mobile robot 100. This can occur due to an anomaly, such as unusually high static friction between the tote 500 and the rack 400, a malfunction of the roller bed 408, skewed placement of the tote 500, uneven weight distribution within the tote 500, and/or for one or more other reasons. Alternatively, a lack of motion immediately after releasing the tote 500 may be an ordinary and intentional part of a process flow for the tote 500.

Figure 20:
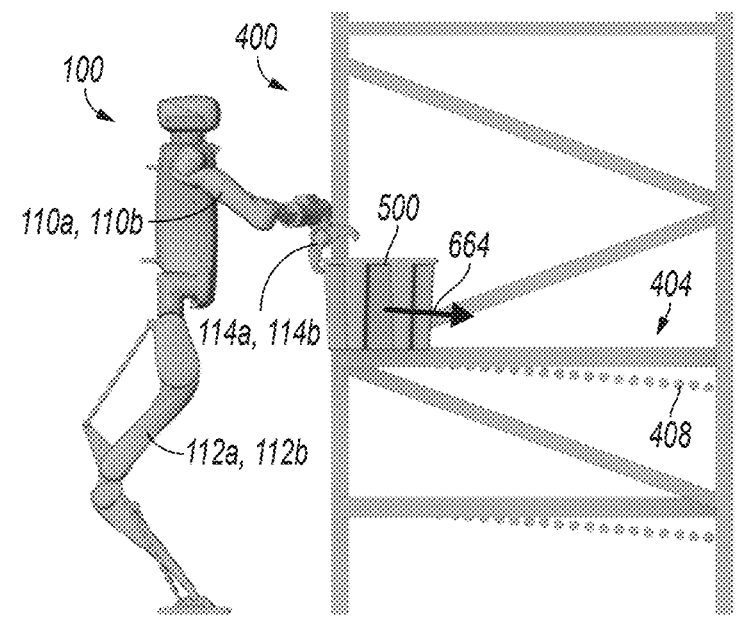
Figure 21:
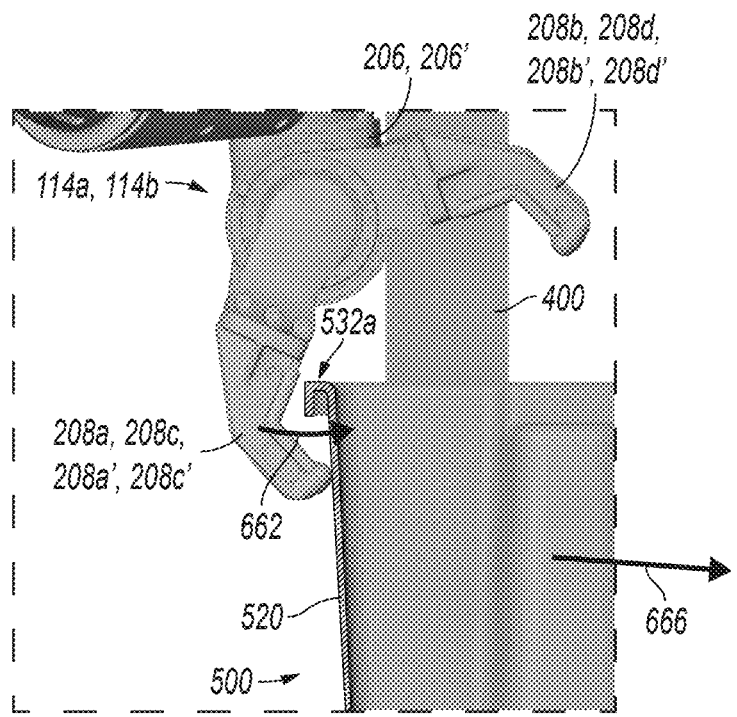
Figure 22:
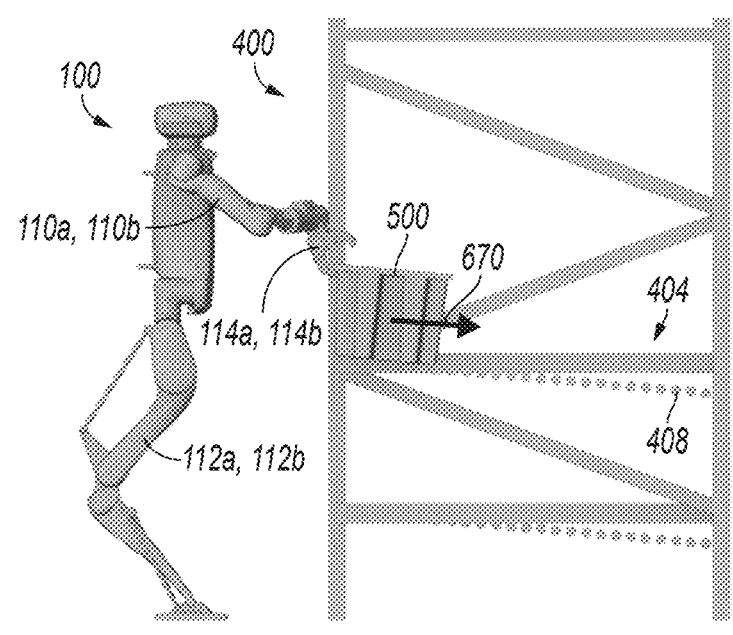
Figure 23:
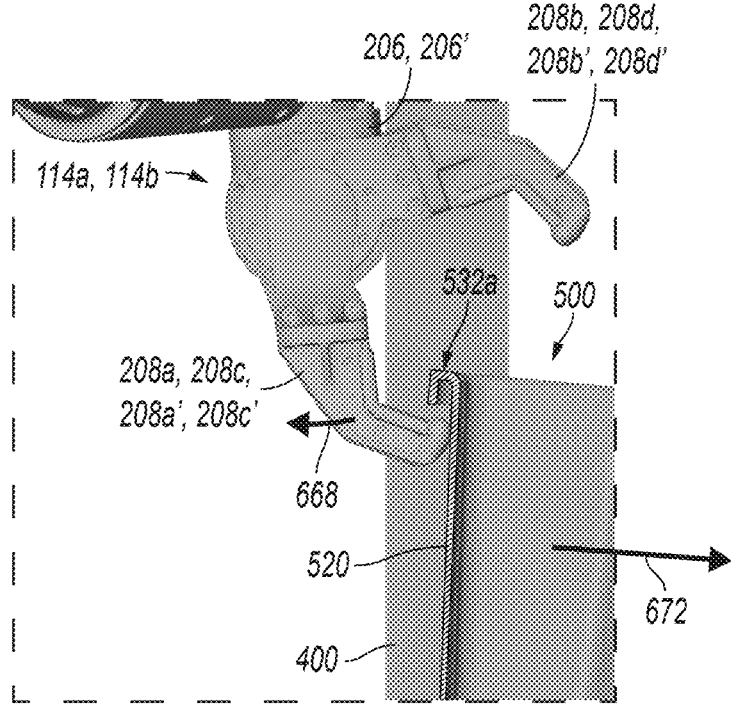

The method 600 can further include nudging the object (block 602d). FIGS. 20 and 21 show the mobile robot 100, the rack 400, and the tote 500 immediately before nudging the tote 500. FIGS. 22 and 23 show the mobile robot 100, the rack 400, and the tote 500 immediately after nudging the tote 500. As shown in FIGS. 20-23, nudging the tote 500 can occur via contact between the tote 500 and the fingers 208a, 208c, 208a', 208c'. Furthermore, nudging the tote 500 can occur while the fingers 208b, 208d, 208b', 208d' are out of contact with the tote 500. For example, nudging the tote 500 can occur after releasing the tote 500 and/or after increasing the distance between opposing pairs of the fingers 208a-208d, 208a'-208d'. Nudging the tote 500 can include rotating the fingers 208a, 208c relative to the base 206 about the axis 212 in the direction of arrow 662 and rotating the fingers 208a', 208c' relative to the base 206' about the axis 212' also in the direction of arrow 662. In at least some cases, the axes 212, 212' are within 10 degrees of parallel to one another during this rotation. Due to the delay discussed above in connection with FIGS. 18 and 19, initiating the nudging rotation of the fingers 208a, 208c, 208a', 208c' can occur well after the opposing ones of the fingers 208b, 208d, 208b', 208d' break contact with the tote 500, such as at least one second or at least two seconds thereafter. In some cases, rotating the fingers 208a, 208c, 208a', 208c' while nudging the tote 500 decreases respective distances between the fingers 208a, 208c, 208a', 208c' and opposing ones of the fingers 208b, 208d, 208b', 208d'. Relatedly, nudging the tote 500 can include moving the end effectors 114a, 114b (e.g., in the direction of the nudging) in addition to or instead of rotating the fingers 208a, 208c, 208a', 208c'. For example, nudging the tote 500 can include rotating the fingers 208a, 208c, 208a', 208c' via the bases 206, 206' rather than relative to the bases 206, 206'.

As shown in FIGS. 20 and 21, the nudging can cause the tote 500 to move in the direction of arrows 664, 666. The nudging can urge the tote 500 from the intermediate placing state shown in FIGS. 20 and 21 toward a subsequent placing state shown in FIGS. 22 and 23. The tote 500 can have different respective positions in these states. In at least some cases, the tote 500 is stationary in the intermediate placing state immediately before nudging by the mobile robot 100. In these and other cases, the tote 500 can move independently of the mobile robot 100 from the subsequent placing state toward a final placing state (not shown) immediately after nudging by the mobile robot 100. As discussed above, a counterpart of the illustrated example can include nudging in a direction other than forward. When nudging the tote 500 is by pulling instead of pushing, the nudging can be via contact between the tote 500 and the fingers 208*b*, 208*d*, 208*b'*, 208*d'* while the fingers 208*a*, 208*c*, 208*a'*, 208*c'* are out of contact with the tote 500.

With reference again to the illustrated example, the method 600 can further include clearing the tote 500 (block 602*e*) after nudging the tote 500. This can include at least partially reversing an action that caused the nudging. For example, clearing the tote 500 can include recoiling the fingers 208*a*, 208*c*, 208*a'*, 208*c'* and/or reversing rotation of the bases 206, 206'. As best shown in FIG. 23, clearing the tote 500 can include rotating the fingers 208*a*, 208*c* with and/or relative to the base 206 about the axis 212 in the direction of arrow 668 and rotating the fingers 208*a'*, 208*c'* with and/or relative to the base 206' about the axis 212' also in the direction of arrow 668. The direction of rotation associated with clearing the tote 500 can be opposite to the direction of rotation associated with nudging the tote 500. In some cases, rotating the fingers 208*a*, 208*c*, 208*a'*, 208*c'* while clearing the tote 500 increases respective distances between the fingers 208*a*, 208*c*, 208*a'*, 208*c'* and opposing ones of the fingers 208*b*, 208*d*, 208*b'*, 208*d'*.

Figure 24:
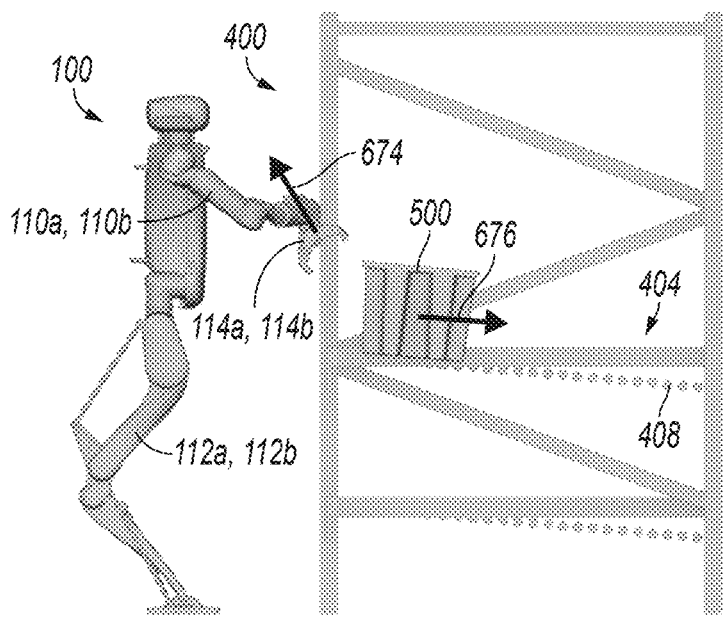
Figure 25:
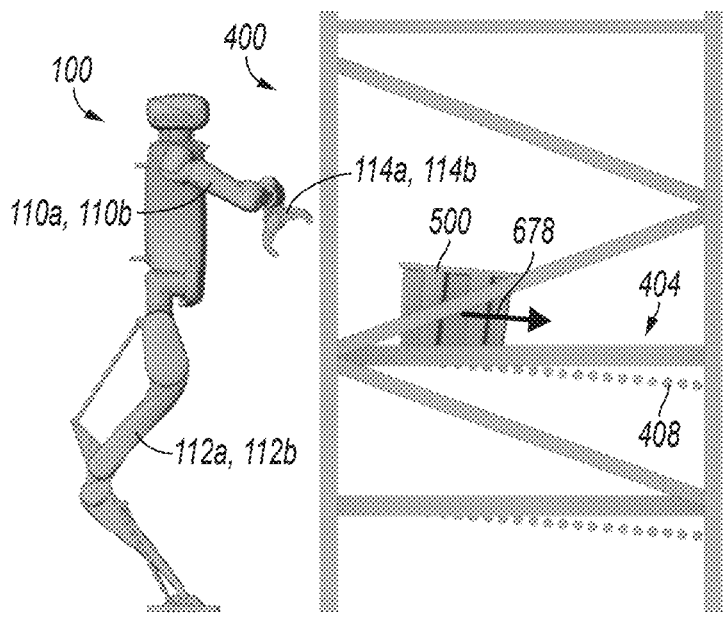

While clearing the tote 500, the tote 500 can continue moving in the direction of the arrows 670, 672 by gravity. Clearing the tote 500 can be useful to reduce or prevent a disruption in this movement, such as a disruption associated with catching, hooking, collision, or other contact between the fingers 208*a*, 208*c*, 208*a'*, 208*c'* and the tote 500. In at least some cases, recoiling the fingers 208*a*, 208*c*, 208*a'*, 208*c'* occurs very quickly after nudging the tote 500. For example, a time between rotating the fingers 208*a*, 208*c*, 208*a'*, 208*c'* to nudge the tote 500 and rotating the fingers 208*a*, 208*c*, 208*a'*, 208*c'* to clear the tote 500 can be less than one second, such as less than 500 milliseconds or less than 200 milliseconds. This timing can likewise be useful to reduce or prevent a disruption in subsequent movement of the tote 500, such as a disruption associated with catching, hooking, collision, or other contact between the fingers 208*a*, 208*c*, 208*a'*, 208*c'* and the tote 500. As shown in FIGS. 24 and 25, clearing the tote 500 can further include moving the end effectors 114*a*, 114*b* away from the tote 500. In at least some cases, this occurs after recoiling the fingers 208*a*, 208*c*, 208*a'*, 208*c'*. Movement of the end effectors 114*a*, 114*b* can be in the direction of arrow 674, which is posterior and superior relative to the body 102. Meanwhile, the tote 500 can continue moving in the direction of the arrows 676, 678 by gravity.

Figure 26:
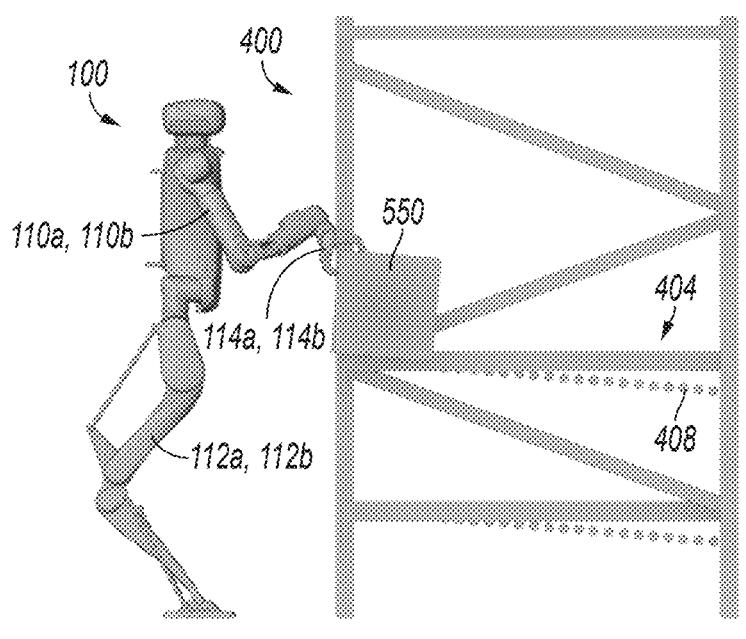
FIGS. 26-31 are profile views alone or in sets of the mobile robot of FIG. 1, the rack of FIG. 7, and the box of FIG. 11 at successive respective times during an example of the method of FIG. 12.
Figure 27:
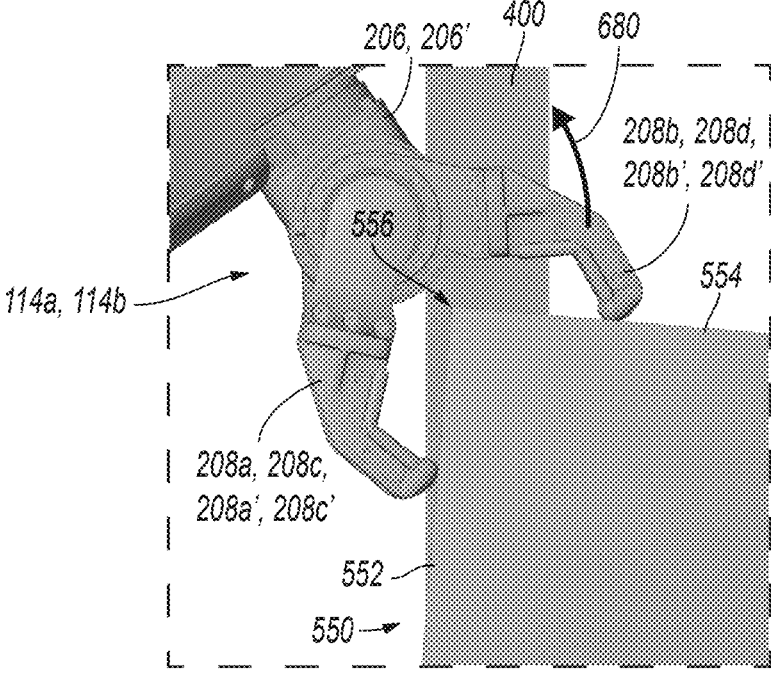
Figure 28:
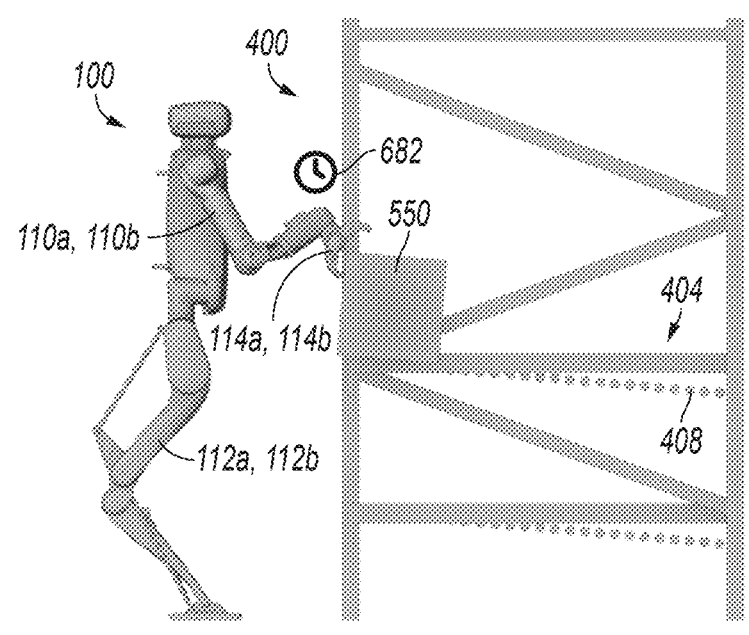
Figure 29:
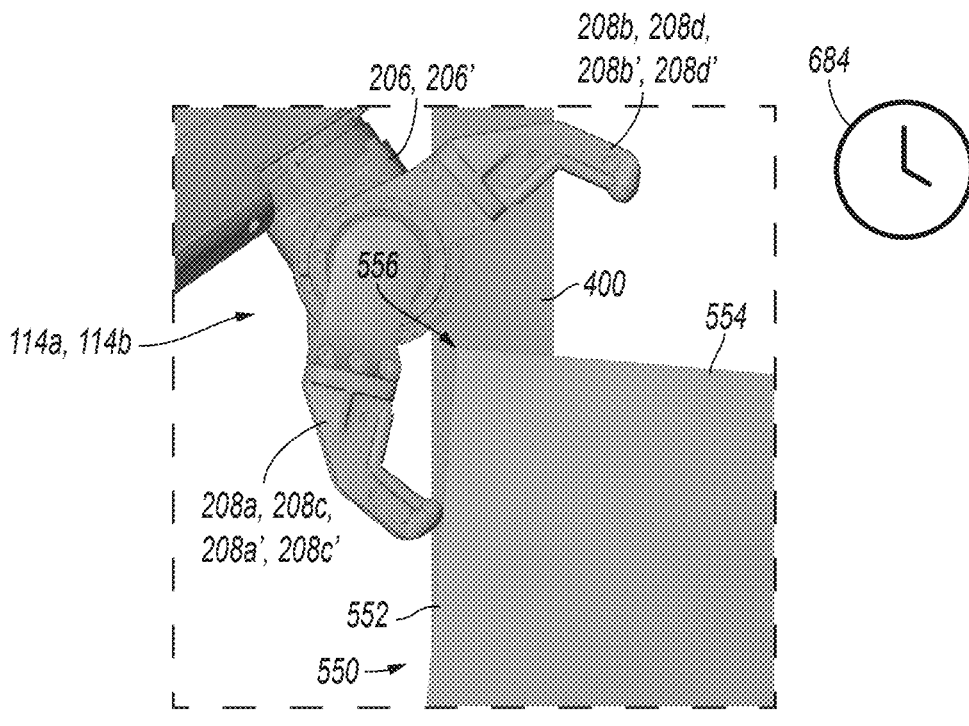
Figure 30:
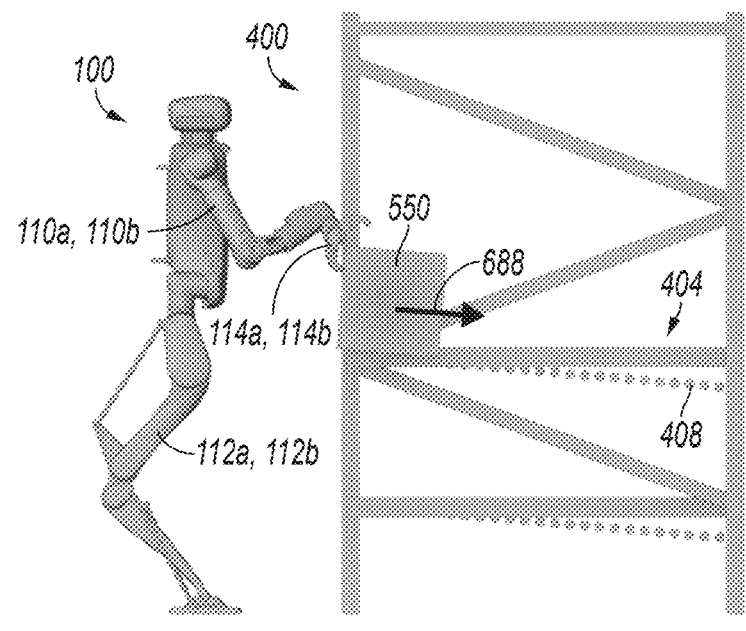
Figure 31:
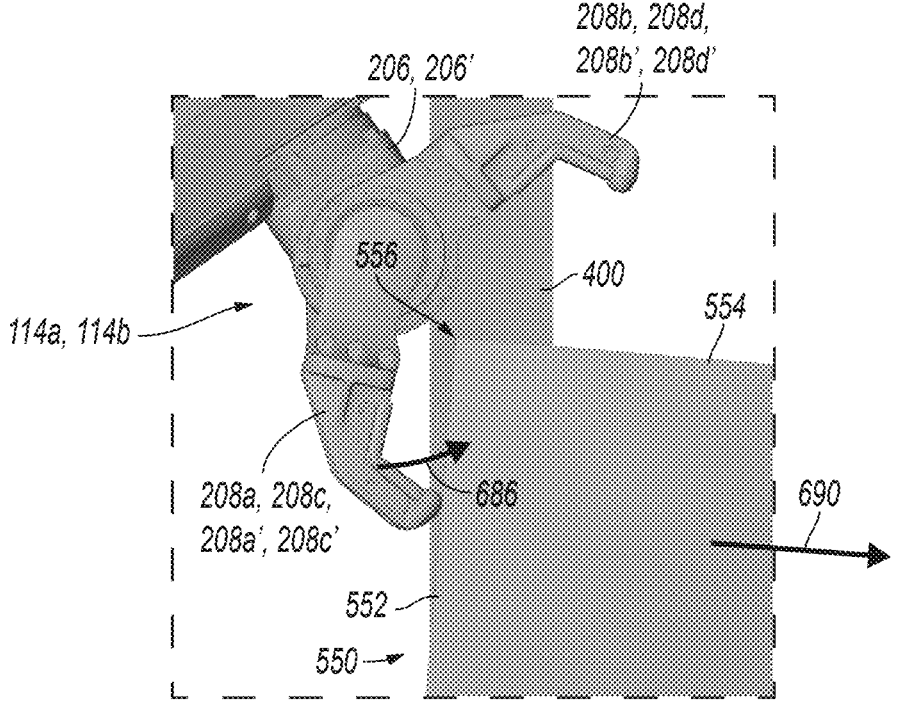

FIGS. 26-31 are profile views alone or in sets of the mobile robot 100, the rack 400, and the box 550 at successive respective times during another example of the method 600. FIGS. 26 and 27, in particular, show a time during the example of the method 600 corresponding to the time shown in FIGS. 16 and 17. This can be a time immediately after staging the box 550. Rather than being disposed at opposite sides of a wall, opposing pairs of the fingers 208*a*-208*d*, 208*a'*-208*d'* can be at an edge region of the box 550 while the mobile robot 100 carries and stages the box 550. For example, the fingers 208*a*, 208*c*, 208*a'*, 208*c'* can be in contact with the box 550 via the sidewall 552 while the fingers 208*b*, 208*d*, 208*b'*, 208*d'* are in contact with the box 550 via the upper wall 554. Portions of the box 550 encompassing portions of the sidewall 552 and the upper wall 554 closest to the edge 556 can be disposed between opposing pairs of the fingers 208*a*-208*d*, 208*a'*-208*d'* while the mobile robot 100 carries and stages the box 550. As shown in FIG. 27, releasing the box 550 can include rotating the fingers 208*b*, 208*d*, 208*b'*, 208*d'* in the direction of arrow 680. As shown in FIGS. 28 and 29, the box 550 can unexpectedly remain stationary after the mobile robot 100 releases the box 550, such as for any of the reasons discussed above for the tote 500 in the context of FIGS. 18 and 19. In the illustrated example of the method 600, the mobile robot 100 can hold the end effectors 114*a*, 114*b* stationary as indicated by clock icons 682, 684, during which time, the box 550 still fails to move. As shown in FIGS. 30 and 31, nudging the box 550 can include rotating the fingers 208*a*, 208*c*, 208*a'*, 208*c'* in the direction of arrow 686. Nudging the box 550 can then cause the box 550 to move in the direction of arrows 688, 690.

Figure 32:
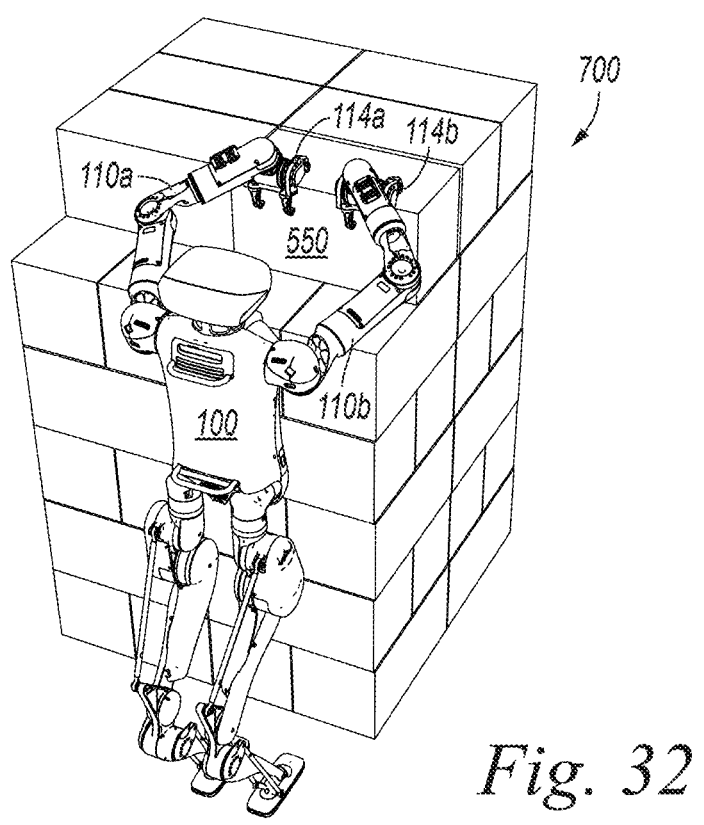
FIGS. 32-35 are perspective views alone or in sets of the mobile robot of FIG. 1 and a stack of many boxes corresponding to the box of FIG. 11 at successive respective times during an example of the method of FIG. 12.
Figure 33:
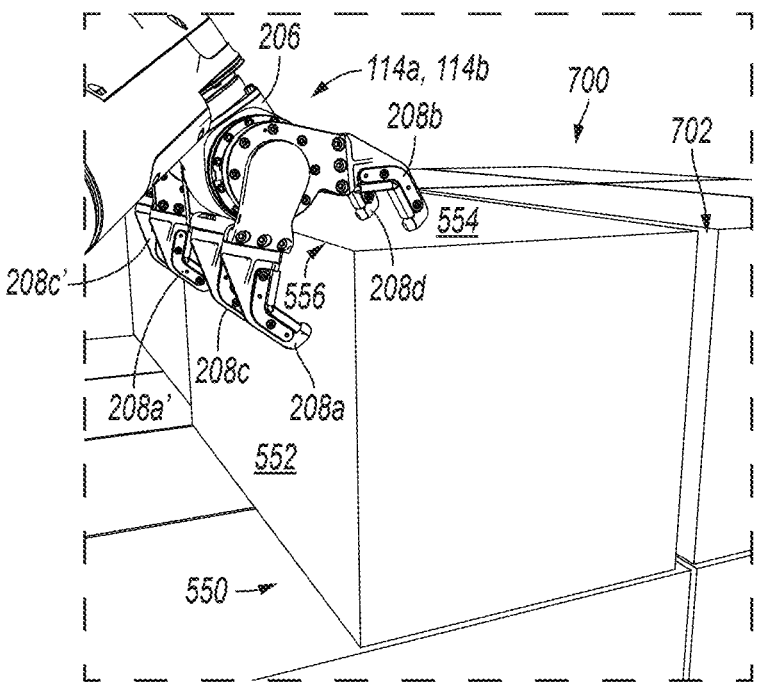
Figure 34:
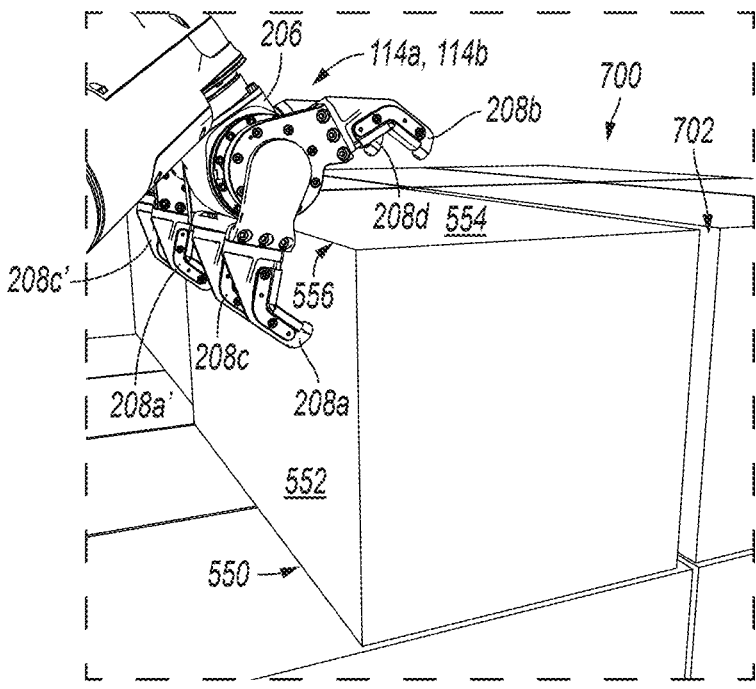
Figure 35:
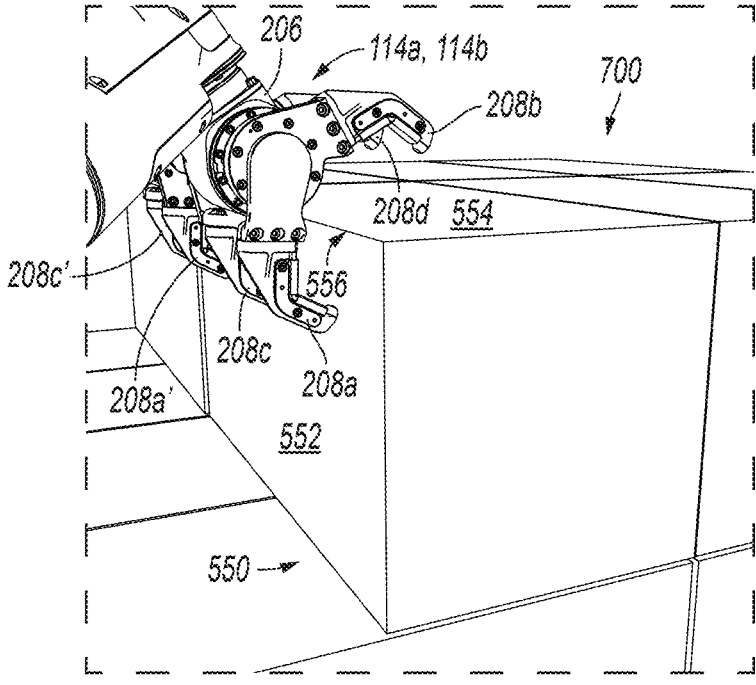

FIGS. 32-35 are perspective views alone or in sets of the mobile robot 100 and a stack 700 of many boxes 550 (one labeled) at successive respective times during another example of the method 600. As shown in FIGS. 32 and 33, the example can include staging the box 550 at a coarse location. Before this, the example can include carrying the box 550 to the stack 700 with any of the corresponding features discussed above in connection with other examples of the method 600. As best shown in FIG. 33, the box 550 in the coarse location can be spaced apart from another box in the stack 700 by a gap 702. Next, as shown in FIG. 34, the example can include releasing the box 550 by rotating the fingers 208*b*, 208*d*, 208*b'*, 208*d'* away from the box 550. As shown in FIG. 35, the example can further include nudging the box 550 via the fingers 208*a*, 208*c*, 208*a'*, 208*c'* to close the gap 702. In at least some cases, the example includes sensing resistance via the fingers 208*a*, 208*c*, 208*a'*, 208*c'*. This can be useful, for example, to reduce or prevent nudging the box 550 from displacing the box on the other side of the gap 702. Additional details regarding sensing are provided below.

Figure 36:
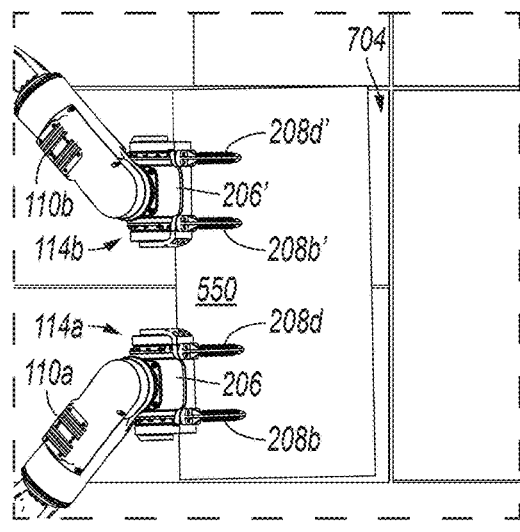
FIGS. 36-38 are top plan views of the mobile robot of FIG. 1 and a stack of many boxes corresponding to the box of FIG. 11 at successive respective times during an example of the method of FIG. 12.
Figure 37:
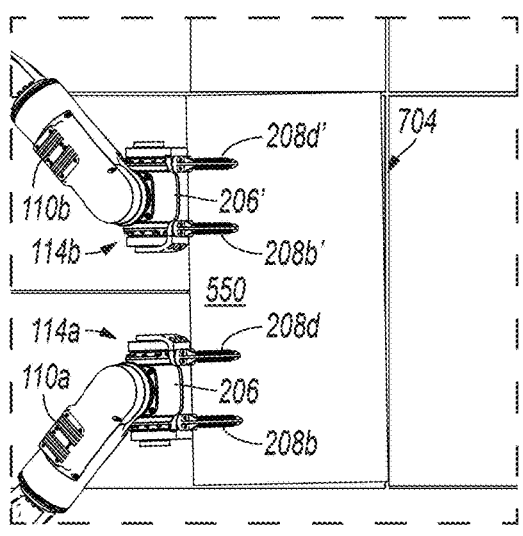
Figure 38:
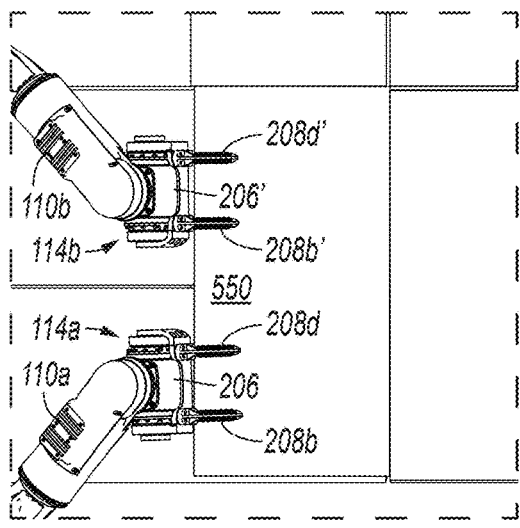

Nudging via the fingers 208*b*, 208*d*, 208*b'*, 208*d'* can be synchronous or asynchronous. FIGS. 36-38 are top plan views of the mobile robot 100 and the stack 700 at successive respective times during an example of the method 600 involving asynchronous nudging. As shown in FIG. 36, the example can include staging the box 550 at a coarse location in which the placed box 550 is skewed relative to other boxes in the stack 700. In particular, there is a tapered gap 704 between the box 550 and a neighboring box. Before this, the example can include carrying the box 550 to the stack 700 with any of the corresponding features discussed above in connection with other examples of the method 600. In FIG. 36, the fingers 208*b*, 208*d*, 208*b'*, 208*d'* are already rotated away from the box 550 to release the box 550. The example can further include synchronously rotating the fingers 208*a*, 208*c*, 208*a'*, 208*c'* to partially close the tapered gap 704. This rotation is implied in FIG. 37 relative to FIG. 36. Next, the example can include further rotating the fingers 208*a*, 208*c* to more fully close the tapered gap 704. This further rotation is implied in FIG. 38 relative to FIG. 37. The end effectors 114*a*, 114*b* can remain substantially stationary during both the synchronous and asynchronous rotations of the fingers 208*a*, 208*c*, 208*a'*, 208*c'*. Alternatively, at least some of the nudging can result from moving one or both of the end effectors 114*a*, 114*b* relative to the stack 700.

A potential advantage of nudging via contact between an object and the fingers 208*a*, 208*c*, 208*a'*, 208*c'* relates to sensing. In at least some cases, moving an object at least primarily by nudging contact is more conducive to feedback sensing than alternative processes, such as moving an object at least primarily by grasping contact. Furthermore, with or without feedback sensing, any of the nudging described herein can be incremental rather than continuous. For example, rotation of some or all of the fingers 208a, 208c, 208a', 208c' during nudging can occur in increments with intervening periods of less or no rotation. In these and other cases, a sensed variable associated with nudging can be resistance. For example, the method 600 in the context of the example shown in FIGS. 26-31 can include sensing a first resistance via the fingers 208a, 208c while nudging the box 550 and sensing a second resistance via the fingers 208a', 208c' also while nudging the box 550. The sensing can occur between successive increments of nudging the box 550. In these and other cases, the sensing can include backdriving the first and second rotary actuators 228, 230 (FIG. 4). Backdriving can be detected, for example, via encoders operably associated with the first and second rotary actuators 228, 230. When sensing indicates a change in resistance, the mobile robot 100 can discontinue nudging. Moreover, this feedback control can be uniform across all of the fingers 208a, 208c, 208a', 208c' or be independent between the fingers 208a, 208c and the fingers 208a', 208c'. In a counterpart of the mobile robot 100 with independently actuated fingers, the feedback control can even be independent at the finger level.

A change in resistance relevant to controlling nudging can be an increase or a decrease. In the example of the method 600 shown in FIGS. 13-25, the tote 500 in the subsequent placing state can begin moving independently of the mobile robot 100, such as by gravity, during nudging. The mobile robot 100 can then sense a decrease in resistance indicating that further nudging is unnecessary. Discontinuing nudging in this case can reduce or prevent interference between the fingers 208a, 208c, 208a', 208c' and the tote 500 that might compromise the successful initiation of independent movement of the tote 500. In the example of the method 600 shown in FIGS. 32-35, the mobile robot 100 can sense an increase in resistance when the box 550 moves into contact with a neighboring box as the gap 702 closes. Discontinuing nudging in this case can reduce or prevent the nudging from displacing the neighboring box. Thus, the neighboring box in this example can act as a stop abutting the nudged box 550. Other types of stops are also possible. For example, a counterpart stop can be a wall, a ledge, a receiving end effector of another mobile robot, etc. In the example of the method 600 shown in FIGS. 36-38, the mobile robot 100 can sense an increase in resistance via the fingers 208b', 208d' and discontinue nudging via the fingers 208b', 208d' in response. The example can further include slightly later sensing an increase in resistance via the fingers 208b, 208d and discontinuing nudging via the fingers 208b, 208d in response. An asynchronicity between discontinuing nudging the box 550 via the fingers 208b', 208d' and via the fingers 208b, 208d can cause the box 550 to move closer to a desired position than if discontinuing nudging the box 550 was fully synchronous. In this way, the mobile robot 100 can close the tapered gap 704 without unduly displacing the neighboring box.

Other forms of feedback control during object nudging are also possible. As an example in the context of FIGS. 13-25, the system 300 can receive vision data on the tote 500 at a time corresponding to FIG. 18 and/or at a time corresponding to FIG. 20 via a vision sensor of the mobile robot 100. The system 300 can process this vision data to determine whether or not the tote 500 is moving. Approaches to this processing include frame differencing, feature tracking, and deep-learning approaches, among others. Based on whether or not the tote 500 is moving, the system 300 can then determine whether nudging the tote 500 is necessary.

For example, if the tote 500 is already moving by gravity or active conveyance, nudging the tote 500 to encourage such movement may be unnecessary. The system 300, therefore, can communicate to the mobile robot 100 in such cases that nudging should be bypassed. Similarly, processing vision data to determine object movement can inform an extent of nudging and/or whether nudging should be repeated. For example, if an initial nudge still fails to result in movement of the tote 500, the mobile robot 100 can move the end effectors 114a, 114b forward an incremental distance and perform a second nudge. If the second nudge also fails to result in movement of the tote 500, the mobile robot 100 can regrasp the tote 500 and repeat staging the tote 500. Other autonomous interventions include moving the tote 500 to a different chute 404 if the different chute 404 is an acceptable destination. Requesting human intervention is yet another intervention that the system 300 can trigger when the tote 500 fails to move as expected after placement. These and other suitable interventions can be organized within a decision tree of the planning module 352. Nodes of the decision tree can be based on information from any suitable sensing type disclosed herein. In another example, system 300 can process vision data to determine object movement between nudge increments or continuously.

In an example of vision-based feedback control in the context of the example shown in FIGS. 36-38, the system 300 can receive vision data on the box 550, the tapered gap 704, and/or a neighboring box at a time corresponding to FIG. 36 via a vision sensor of the mobile robot 100. The computing features 302 of the system 300 can then control rotation of the fingers 208a, 208c, 208a', 208c' and/or movement of the end effectors 114a, 114b to close the tapered gap 704 in response to the vision data. Dynamic control over nudging from vision or other feedback can be based on a deep-learning model trained to output actuator commands in response to such feedback. Nudging instead of other forms of object manipulation can be useful in such cases to simplify the training, to cause more predictable resultant behaviors, to lessen a need for fine manipulation capabilities at higher kinematic levels, and/or for one or more other reasons.

Although the examples disclosed herein may be presented at least primarily in the context of forward, anterior, pushing-type nudging, other examples of methods in accordance with at least some embodiments of the present technology can include other directions and/or types of nudging, such as backward nudging, posterior nudging, lateral nudging, diagonal nudging, pulling-type nudging, etc. For example, in a counterpart of the example shown in FIGS. 12-25, it may be advantageous to place the tote 500 at the downstream end of the chute 404 directly. It may also be advantageous for the tote 500 to abut a stop at this end of the chute 404. Another robot tasked with retrieving the tote 500 may rely on a consistent position of the tote 500 based on a fixed position of the stop. In these and other cases, staging the tote 500 can include placing the tote 500 on the roller bed 408 upstream from the stop and nudging the tote posteriorly into contact with the stop. The action of the fingers 208a, 208c relative to the action of the fingers 208b, 208d and vice versa can be the same as or similar to that shown and described for the illustrated example, but reversed. For example, the fingers 208a, 208c can clear the tote 500 and the fingers 208b, 208d can nudge the tote 500 toward the body 102 from within the tote 500.

In a lateral nudging example, the end effectors 144a, 114b can grip the tote 500 from the front and rear portions 516, 518 of the tote 500, respectively, while the mobile robot 100 carries and stages the tote 500. After staging the tote 500, the mobile robot 100 can remove one of the end effectors 144a, 114b from the tote 500 and then use the other of the end effectors 144a, 114b to nudge the tote 500 in either lateral direction. For example, if the end effector 144a remains in contact with the tote 500 and is oriented with the fingers 208b, 208d inside the tote 500, lateral nudging to the left can be via the fingers 208b, 208d whereas lateral nudging to to the right can be via the fingers 208a, 208c. Selecting the end effector that remains in contact with the tote 500 for nudging can be based at least partially on placement objectives for the tote 500 and/or the presence of one or more obstructions at a destination for the tote 500. For example, if the front portion 516 of the tote 500 is to abut another object when the tote 500 is in a desired final position, it may be advantageous to remove the end effector in contact with the front portion 516 of the tote 500 and to nudge the tote 500 to a final position via the end effector in contact with the rear portion 518 of the tote 500.

Nudging can also be in more than one direction. For example, the mobile robot 100 can carry and stage the tote 500 while the end effectors 114a, 114b are in contact with the tote 500 via the front portion 516 of the tote 500 and the first sidewall 520, respectively, After staging the tote 500, the mobile robot 100 can nudge the tote 500 in a direction parallel to the first object dimension 502 via the end effector in contact with the first sidewall 520. The mobile robot 100 can also nudge the tote 500 in a direction parallel to the third object dimension 506 via the end effector in contact with the front portion 516 of the tote 500. Nudging in these dimensions can be simultaneous or sequential. When simultaneous, the nudging can cause the tote 500 to move diagonally. Finally, it should be noted that these and other additional examples of nudging can be applied to the box 550 and to other suitable objects as well as to the tote 500. For example, nudging the box 550 diagonally can be useful to move the box 550 into a corner formed by neighboring boxes when loading a pallet.

CONCLUSION

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may be disclosed herein in the context of those embodiments, other embodiments may also exhibit such advantages, and not all embodiments need necessarily exhibit such advantages or other advantages disclosed herein to fall within the scope of the present technology. This disclosure and the associated technology can encompass other embodiments not expressly shown or described herein.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Any reference herein to "the inventors" means at least one inventor of the present technology. As used herein, the terms "generally," "substantially," "about," and similar terms are used as terms of approximation and not as terms of degree, and are intended to account for the inherent variations in measured or calculated values that would be recognized by those of ordinary skill in the art. Additionally, the terms "comprising," "including," "having," and the like as used herein mean including at least the recited feature(s) such that any greater number of the same feature(s) and/or one or more additional types of features are not precluded. This is the case even if a particular number of features is specified unless that specified number is preceded by the word "exactly" or another clear indication that it is intended to be closed ended. In a particular example, "comprising two arms" means including at least two arms.

Directional terms, such as "upper," "lower," "front," "back," "vertical," and "horizontal," may be used herein to express and clarify the relationship between various structures. It should be understood that such terms do not denote absolute orientation. Reference herein to "one embodiment," "an embodiment," or similar phrases means that a particular feature, structure, or operation described in connection with such phrases can be included in at least one embodiment of the present technology. Thus, such phrases as used herein are not all referring to the same embodiment. Unless preceded with the word "conventional," reference herein to "counterpart" devices, systems, methods, features, structures, or operations refers to devices, systems, methods, features, structures, or operations in accordance with at least some embodiments of the present technology that are similar to a described device, system, method, feature, structure, or operation in certain respects and different in other respects. As used herein, "receiving" information at computing hardware does not preclude generating the information at the same computing hardware. Finally, it should be noted that various particular features, structures, and operations of the embodiments described herein may be combined in any suitable manner in additional embodiments in accordance with the present technology.

We claim:

1. A method comprising:

carrying, via a mobile robot, an object while:

a first portion of the object is disposed between a first finger and a second finger of the mobile robot, wherein the first and second fingers are opposable, wherein the mobile robot includes a first end effector, and wherein the robot includes the first and second fingers as respective portions of the first end effector, and a second portion of the object is disposed between a third finger and a fourth finger of the mobile robot, wherein the third and fourth fingers are opposable, wherein the mobile robot includes a second end effector, and wherein the mobile robot includes the third and fourth fingers as respective portions of the second end effector;

moving, via the mobile robot, the object to an intermediate placing state after carrying the object;

increasing a distance between the first and second fingers after moving the object to the intermediate placing state;

increasing a distance between the third and fourth fingers after moving the object to the intermediate placing state;

nudging the object via contact between the object and the first and third fingers after increasing the distance between the first and second fingers, after increasing the distance between the third and fourth fingers, while the second finger is out of contact with the object, and while the fourth finger is out of contact with the object, wherein nudging the object urges the object from the intermediate placing state toward a subsequent placing state, and wherein the object in the intermediate and subsequent placing states has different respective positions;

discontinuing nudging the object via the first finger; and discontinuing nudging the object via the third finger, wherein an asynchronicity between discontinuing nudging the object via the first and third fingers, respectively, causes the object to move closer to a desired position than if discontinuing nudging the object via the first and third fingers, respectively, was fully synchronous.

2. The method of claim 1, further comprising:

sensing a first resistance via the first finger while nudging the object; and sensing a second resistance via the third finger while nudging the object.

3. The method of claim 2, wherein:

nudging the object includes:

incrementally nudging the object via the first finger, and incrementally nudging the object via the third finger;

sensing the first resistance includes sensing the first resistance between successive increments of nudging the object via the first finger; and sensing the second resistance includes sensing the second resistance between successive increments of nudging the object via the third finger.

4. The method of claim 3, wherein:

sensing the first resistance includes backdriving a first actuator of the mobile robot; and sensing the second resistance includes backdriving a second actuator of the mobile robot.

5. The method of claim 1, further comprising:

sensing a change in a first resistance via the first finger;

discontinuing nudging the object via the first finger at least partially in response to sensing the change in the first resistance;

sensing a change in a second resistance via the third finger; and discontinuing nudging the object via the third finger at least partially in response to sensing the change in the second resistance.

6. The method of claim 1, wherein:

the first, second, third, and fourth fingers individually are elongate and include a distal end portion, a proximal end portion, and an intermediate portion therebetween; and carrying the object includes carrying the object while the respective distal end portions of the first, second, third, and fourth fingers are in contact with the object and while the respective intermediate portions of the first, second, third, and fourth fingers are out of contact with the object.

7. The method of claim 1, wherein:

the mobile robot includes:

a first base as a portion of the first end effector, and a second base as a portion of the second end effector;

the first and second fingers are rotatably connected to the first base;

the third and fourth fingers are rotatably connected to the second base;

increasing the distance between the first and second fingers includes rotating the second finger relative to the first base about a first axis;

increasing the distance between the third and fourth fingers includes rotating the fourth finger relative to the second base about a second axis; and nudging the object includes:

rotating the first finger relative to the first base about the first axis, and rotating the third finger relative to the second base about the second axis.

8. The method of claim 7, wherein the first and second axes are within 10 degrees of parallel to one another.

9. The method of claim 1, wherein:

the object is cuboid;

the object includes a side wall, an upper wall, and an edge therebetween;

the first and second portions of the object are at the edge; and carrying the object includes carrying the object while:

the first and second fingers are in contact with the object via the side wall and the upper wall, respectively, and the third and fourth fingers are in contact with the object via the side wall and the upper wall, respectively.

10. The method of claim 9, wherein the object is a box.

11. The method of claim 7, wherein:

rotating the first finger relative to the first base about the first axis includes rotating the first finger relative to the first base in a first direction about the first axis;

the method further comprises rotating the first finger relative to the first base in a second direction about the first axis opposite to the first direction after nudging the object;

rotating the first finger relative to the first base in the second direction increases a distance between the first finger and the object;

rotating the third finger relative to the second base about the second axis includes rotating the third finger relative to the second base in a third direction about the second axis;

the method further comprises rotating the third finger relative to the second base in a fourth direction about the second axis opposite to the third direction after nudging the object; and rotating the third finger relative to the second base in the fourth direction increases a distance between the third finger and the object.

12. A method comprising:

carrying, via a mobile robot, an object while:

the mobile robot includes:

a first end effector including:

a first base, a first finger rotatably connected to the first base, and a second finger rotatably connected to the first base and opposable relative to the first finger, and a second end effector including:

a second base, a third finger rotatably connected to the second base, and a fourth finger rotatably connected to the second base and opposable relative to the third finger, a first portion of the object is disposed between the first finger and the second finger, and a second portion of the object is disposed between the third finger and the fourth finger;

moving, via the mobile robot, the object to an intermediate placing state after carrying the object;

increasing a distance between the first and second fingers by rotating the second finger relative to the first base about a first axis after moving the object to the intermediate placing state;

breaking contact between the second finger and the object while rotating the second finger relative to the first base;

increasing a distance between the third and fourth fingers by rotating the fourth finger relative to the second base about a second axis after moving the object to the intermediate placing state;

breaking contact between the fourth finger and the object while rotating the fourth finger relative to the second base; and nudging the object via contact between the object and the first and third fingers after increasing the distance between the first and second fingers, after increasing the distance between the third and fourth fingers, while the second finger is out of contact with the object, and while the fourth finger is out of contact with the object, wherein nudging the object urges the object from the intermediate placing state toward a subsequent placing state, wherein the object in the intermediate and subsequent placing states has different respective positions, and wherein nudging the object includes:

rotating the first finger relative to the first base, including initiating rotation of the first finger relative to the first base at least one second after a latter of breaking contact between the second finger and the object and breaking contact between the fourth finger and the object, and rotating the third finger relative to the second base, including initiating rotation of the third finger relative to the second base at least one second after the latter of breaking contact between the second finger and the object and breaking contact between the fourth finger and the object.

13. The method of claim 12, wherein:

the object is stationary in the intermediate placing state immediately before nudging the object; and the object moves independently of the mobile robot from the subsequent placing state toward a final placing state immediately after nudging the object.

14. The method of claim 12, wherein:

rotating the first finger relative to the first base about the first axis includes rotating the first finger relative to the first base in a first direction about the first axis;

the method further comprises rotating the first finger relative to the first base in a second direction about the first axis opposite to the first direction after nudging the object;

rotating the first finger relative to the first base in the second direction increases a distance between the first finger and the object;

rotating the third finger relative to the second base about the second axis includes rotating the third finger relative to the second base in a third direction about the second axis;

the method further comprises rotating the third finger relative to the second base in a fourth direction about the second axis opposite to the third direction after nudging the object; and rotating the third finger relative to the second base in the fourth direction increases a distance between the third finger and the object.

15. The method of claim 14, wherein:

a first time between rotating the first finger relative to the first base in the first direction and rotating the first finger relative to the first base in the second direction is less than one second; and a second time between rotating the third finger relative to the second base in the third direction and rotating the third finger relative to the second base in the fourth direction is less than one second.

16. The method of claim 14, further comprising:

moving the first end effector away from the object after rotating the first finger relative to the first base in the second direction; and moving the second end effector away from the object after rotating the third finger relative to the second base in the fourth direction.

17. The method of claim 16, wherein:

moving the first end effector away from the object includes moving the first end effector posteriorly and superiorly relative to a body of the mobile robot; and moving the second end effector away from the object includes moving the second end effector posteriorly and superiorly relative to the body of the mobile robot.

18. The method of claim 12, wherein:

the object includes a wall having an upper rim; and the first and second portions of the object are different respective portions of the wall at the upper rim.

19. The method of claim 18, wherein the object is a tote.

20. The method of claim 12, wherein the first and second axes are within 10 degrees of parallel to one another.

* * * * *